United States Patent [19]

Okada et al.

[11] Patent Number: 4,858,032

[45] Date of Patent: Aug. 15, 1989

[54] DEVICE FOR EXTRACTING STILL PICTURE FRAMES FROM A MOVING IMAGE VIDEO SIGNAL AND RECORDING SAME ON A MAGNETIC RECORDING MEDIUM

[75] Inventors: Kazuo Okada; Masahiro Konishi, both of Tokyo, Japan

[73] Assignee: Fuji Photo Film Co., Ltd., Kanagawa, Japan

[21] Appl. No.: 66,566

[22] Filed: Jun. 26, 1987

[30] Foreign Application Priority Data

| Jun. 30, 1986 | [JP] | Japan | 61-153625 |
| Jun. 30, 1986 | [JP] | Japan | 61-153626 |
| Jun. 30, 1986 | [JP] | Japan | 61-153627 |
| Jun. 30, 1986 | [JP] | Japan | 61-153628 |
| Jun. 30, 1986 | [JP] | Japan | 61-153629 |
| Aug. 20, 1986 | [JP] | Japan | 61-194539 |
| Jan. 13, 1987 | [JP] | Japan | 62-5805 |

[51] Int. Cl.⁴ .................. H04N 5/78; H04N 9/491; H04N 5/76

[52] U.S. Cl. .................. 360/91; 360/10.3; 360/19.1; 360/32; 360/33.1; 358/310; 358/335; 358/343

[58] Field of Search .......... 360/10.3, 18, 19.1, 360/9.1, 20, 32, 33.1; 358/310, 312, 906, 343, 335

[56] References Cited

U.S. PATENT DOCUMENTS

| 4,509,083 | 4/1985 | Nakano | 360/19.1 X |
| 4,575,772 | 3/1986 | Shimada et al. | 360/19.1 |
| 4,677,469 | 6/1987 | Yamaji et al. | 358/312 X |

Primary Examiner—Aristotelis M. Psitos
Attorney, Agent, or Firm—Birch, Stewart, Kolasch & Birch

[57] ABSTRACT

Disclosed herein is a magnetic recording device simple in arrangement, in which, while a motion picture is being recorded, a unitary part of the motion picture is extracted to perform a still picture recording operation with high picture quality.

9 Claims, 20 Drawing Sheets

FIG. 5

| Spec. | A | B | C | D |
|---|---|---|---|---|
| Video H Number Recorded On A PCM Track | 1 | 1 | 2 | 1.5 |
| Color Difference Recording System H Blank | Full Record | Full Non-Record | Non-Record | Non-Record |
| Effective Scanning Line Number/Frame | 420 Lines | | | |
| Filter | End Of Passband: Start of Stopband = 1 : 1.3 | | | |
| Y+S { Base-Band Freq. Char. / Sampling Freq. | 4.23 MHz(±1dB) / 11.01 MHz(700fH) | 5.28MHz(±1dB) / 13.72MHz(872fH) | 3.17MHz / 8.24MHz(524fH) | 4.23 MHz / 11.01MHz(700fH) |
| R-Y/B-Y { Base-Band Freq. Char. / Sampling Freq. | 1.05MHz / 2.75MHz(175fH) | 1.32 MHz / 3.43MHz(218fH) | 0.79 MHz / 2.06MHz(131fH) | 1.05MHz / 2.75MHz(175fH) |
| Pixel { Luminance / Color Difference | 700x420x8=2352000  700x420x8x2=1176000 / 175x420x8=2352000  175x420x8x2=1176000 | 700x420x8=2352000 / 175x420x8x2=1176000 | 420x420x8=1411200 / 105x420x8x2=352800 | 560x420x8=1881600 / 140x420x8=470400 |
| Total Memory Bit Number | 3528000 bit | 3528000 bit | 1764000 bit | 2352000 bit |
| Bit Number / 1H | 8400 bit | 8400 bit | 4200 bit | 5600 bit |
| Recording PCM Track No. | 420 Tracks | 420 Tracks | 210 Tracks | 280 Tracks |
| Recording Time | 7 sec. | 7 sec. | 3.5 sec. | 4.7 sec. |
| Bit Number/PCM Track | 8400 bit | | | |

DEVICE FOR EXTRACTING STILL PICTURE FRAMES FROM A MOVING IMAGE VIDEO SIGNAL AND RECORDING SAME ON A MAGNETIC RECORDING MEDIUM

BACKGROUND OF THE INVENTION

1. Field of the Application

This invention relates to a magnetic recording device such as a video tape recorder (VTR), and more particularly to a magnetic recording device simple in arrangement which is capable of recording still pictures with high picture quality.

2. Description of the Prior Art

Recently, a so-called "camera recorder" has been popularly used which is formed by combining a video camera and a VTR in an eight mm video cassette recorder (hereinafter referred to as "an 8-mm video cassette recorder") or a VHS-C.

A specific feature of the camera recorder is that it is small in size and lightweight. Therefore, the camera recorder is suitable for a person to carry while travelling or to a particular event such as an athletic meeting, and has been sufficiently improved in picture quality to a degree which is acceptable for ordinary use.

For instance, the image pickup tube or image pickup element which is the most essential component in a video camera has been improved in sensitivity and in resolution. Especially in the case of a CCD (charge-coupled device), the number of picture elements has been increased to about 250,000, so that the resolution has been increased by about 30%, and the occurrence of smear and moire phenomena has been suppressed.

With respect to the circuitry, the emphasis circuit and the comb type filter have been improved to increase the S/N ratio. Furthermore, the camera recorder has an advantage inherent therein that, since the camera is coupled directly to the VTR, a circuit for mixing a luminance signal and color signal and a circuit for separating these signals can be omitted, so that it is unnecessary to compress the band of the luminance signal and the color signal, which thus improves the resolution and the color reproducibility.

In general, with a video camera, a motion picture of moving persons or scenes is taken, but a still picture is rarely taken. However, often a single frame of the motion picture is reproduced as a still picture for observation.

In reproduction of a still picture with a VTR, the resultant picture often suffers from blur and noise. This difficulty is attributed to a tracking error which is caused when the magnetic head does not accurately trace the video track where a picture to be reproduced has been recorded. However, a recent VTR has been equipped with a magnetic head for reproducing still pictures only, to lessen the effect of the blur or noise.

On the other hand, recently a video printer for providing a video image as a hard copy has been proposed, and therefore it can be considered that it will become popular to print a still picture from a video signal for enjoyment.

Problems to be Solved by the Invention

In the case of a still picture, the data of the picture which are invariable with time are observed as visual data. Therefore, a still picture must be much higher in picture quality than a motion picture. Therefore, if the reproducing video signal includes jitter or dropout, then the resultant picture may suffer from swing, distortion, color irregularity and noise; sometimes the picture quality is so greatly lowered that the still picture is no longer observable. The picture quality thus lowered becomes more significant when such still picture is provided as a hard copy.

Although the video camera, and especially the camera recorder has come into wide use, its picture quality is much lower than the photographic picture. Therefore, the user commonly employs a camera recorder or a portable separable camera for taking a motion picture, and a photographic picture still camera for taking a still picture. Sometimes he is forced to carry both a video camera and a still camera with him.

The video system can be divided into an image pickup system, a recording system, and a hard copy system. For the image pickup system, the development of a CCD having 400,000 picture elements is in progress, and the CCD will be realized soon. For the hard copy system, recently the picture quality has been markedly improved, and it will soon reach a practically useful level. Therefore, the remaining recording system is important; however, while a variety of signal processing circuits for improving a picture quality have been proposed, no still picture which is high enough to enjoy has been obtained.

SUMMARY OF THE INVENTION

In view of the foregoing, an object of this invention is to provide a magnetic recording device in which, while a motion picture is being recorded, a unitary part of the motion picture is extracted to perform a still picture recording operation with high picture quality.

Merely adding a still picture recording function to a video camera can be readily achieved by combining a still picture recording device with the latter since a variety of still picture recording devices have been proposed in the art. Such approaches have been tried in various manners with the result that the devices produced are heavy in weight and high in manufacturing cost and are not well balanced. In order to popularize the video camera having a still picture recording function, it goes without saying that it must be sufficiently high in picture quality, and it is also essential that it is lightweight; that is, it should be such that no heavy mechanisms are included. Furthermore, the video camera should be low in manufacturing cost. However, no magnetic recording device which satisfies the above-described requirements has yet been proposed.

Accordingly, an object of this invention is to provide a magnetic recording device which is well balanced in arrangement and can be conveniently used. More specifically, an object of the invention is to provide a magnetic recording device which is lightweight and low in manufacturing cost and which can record still pictures with high quality.

Another object of the invention is to provide a magnetic recording device which can record a still picture with high picture quality and record an audio signal with high sound quality.

A further object of the invention is to provide a magnetic recording device in which a still picture is completely recorded, when it is instructed to stop a motion picture recording operation for recording a necessary still picture.

A still further object of the present invention is to provide a magnetic reproducing device capable of reproducing still pictures high in picture quality.

The foregoing objects of the invention have been achieved by the provision of a magnetic recording device of a helical scanning system in which a magnetic tape is transported while being obliquely wound on a cylinder through a predetermined angle, which is provided with rotary magnetic heads, and whenever the magnetic heads scan the magnetic tape obliquely, an analog video signal of a motion picture is recorded as well as a unitary picture component such as a frame or field, in which, according to the invention, PCM still picture recording means for carrying out a PCM still picture recording operation in a time division manner in a scanning period of the magnetic heads is provided, the PCM still picture recording means comprising: means for converting the analog video signal of the motion picture into a digital video signal; means for receiving the digital video signal for the unitary picture component and subjecting the digital video signal thus received to time axis expansion; and means for converting the digital video signal for the unitary picture component into a PCM signal which is recorded over a plurality of continual head scanning periods of time with a predetermined period.

In the magnetic recording device of the invention, whenever the magnetic heads scan the magnetic tape, a motion picture and a still picture are recorded in a time division manner. The motion picture is recorded in the form of an analog video signal similarly as in the case of the conventional magnetic recording device, while the still picture is recorded in the form of a PCM signal.

Such a still picture is a unitary part of a motion picture, i.e., one frame which is extracted out of the motion picture at a predetermined period.

The digital video signal of the unitary picture component thus extracted, after being time-axis expanded at a predetermined rate, is recorded as a predetermined portion, in the form of a PCM signal, during a head scanning period. A plurality of head scanning periods of time are used for recording one unitary picture component.

After the PCM still picture recording operation is accomplished in this manner, the operation of extracting a unitary picture component out of the motion picture is carried out again, the unitary picture component together with the motion picture is PCM-recorded as a still picture on the same magnetic tape with the same magnetic head in a time division manner.

That is, while a motion picture is being recorded, parts of the motion pictures (frames) are PCM-recorded as still pictures at predetermined intervals.

A still picture reproduced by the PCM still picture recording in the invention is not affected by a time base error caused by jitter in the PCM recording operation and is free from dropout; that is, it is less affected by these factors. Therefore, the resultant still picture is high enough in picture quality to enjoy and can be stored for a long period of time.

BRIEF DESCRIPTION OF THE DRAWINGS

In the accompanying drawings;

FIG. 5 is a diagram showing modification examples of a specification for the PCM still picture recording operation in the invention;

DETAILED DESCRIPTION OF THE PREFERRED EMBODIMENTS

One embodiment of this invention applied to an 8 mm video cassette recorder will be described with reference to FIGS. 1 through 5.

First, the 8-mm video format will be described with reference to FIGS. 1 and 2.

As is well known in the art, the 8-mm video system has been standardized by the "8-mm Video Social Gathering", and is significantly different from the conventional VHS system or beta system in that the tape width is much smaller, both in the audio signal recording system and in the tracking system.

Figure 1:
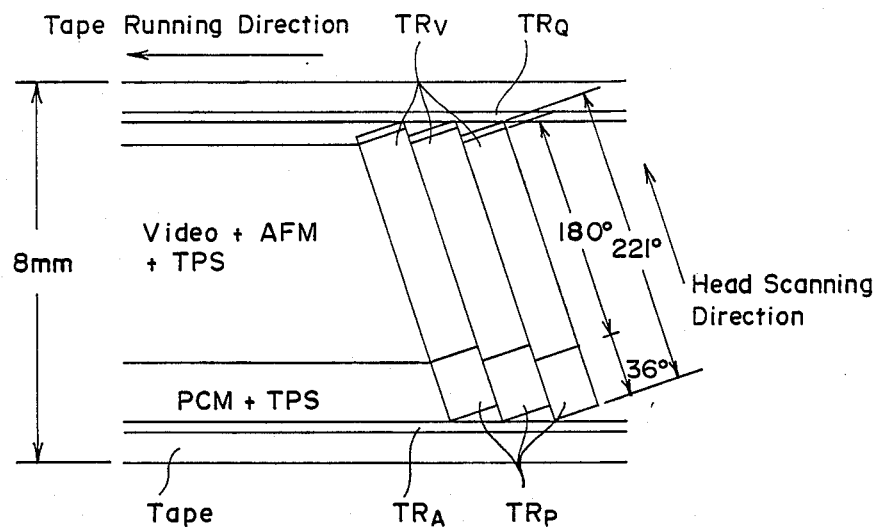
FIG. 1 is an explanatory diagram showing the arrangement of tracks on a magnetic tape in an 8-mm video format.

FIG. 1 shows the arrangement of tracks on the magnetic tape in the 8-mm video system. The tape has a width of 8 mm, and is a metal tape of coating or vacuum deposition tape. Similarly as in the conventional system, the tracks are formed obliquely on the tape by helical scanning. A PCM track $TR_p$ corresponding to a head scan of 36° is formed on the extension of each of video tracks $TR_v$ corresponding to a head scan of 180°. In the video tracks $TR_v$, video signals (Video) are recorded similarly as in the conventional system, and FM audio signals (AFM) and tracking pilot signals (TPS) are recorded in a frequency multiplex mode. On the other hand, in the PCM tracks $TR_p$, time-compressed audio signals are recorded by PCM (hereinafter referred to as "PCM-recording", and tracking pilot signals (TPS) are recorded in a superposition mode. The PCM recording is optional; that is, after-recording can be employed.

Figure 2:
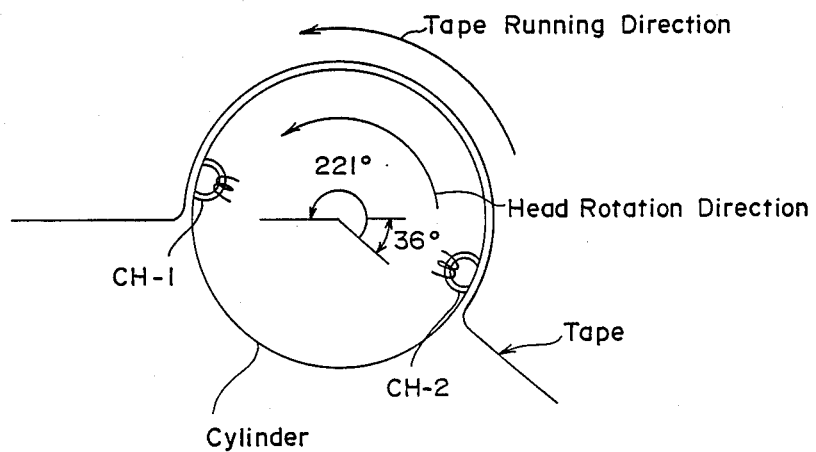
FIG. 2 is an explanatory diagram showing a tape winding angle in the 8-mm video format.

As shown in FIG. 2, the PCM track TRP is obtained by increasing the drum winding angle, which is usually 180°, by 36°. As is apparent from the arrangement of video heads in FIG. 2, when one video head CH-1 accomplishes the recording of a video track $TR_V$, the other video head CH-2 starts the PCM recording of the succeeding PCM track $TR_P$.

Referring back to FIG. 1, a cue track $TR_Q$ for recording cue signals and an audio track $TR_A$ for recording audio signals are provided on both sides of the tracks TR described above, respectively. These tracks $TR_Q$ and $TR_A$ are optional.

The tracking pilot signals TPS are provided according to the automatic track finding (ATF) system. Four tracking pilot signals f1 through f4 different in frequency from one another are successively recorded on the tracks TR. In reproduction, tracking servo is effected in such a manner that tracing is carried out with high accuracy by detecting the frequency difference between adjacent tracking pilot signals. Accordingly, in the 8-mm video system, control tracks of the stationary head type are not employed.

In the embodiment of the invention, as described later, part of a motion picture is PCM-recorded, as a still picture, in the pCM tracks TRP, and the PCM still picture recording is carried out substantially in the same PCM format as the PCM audio recording. Thus, a PCM encoder for PCM audio recording is also used for recording a still picture.

Constitution of the Embodiment

Figure 3:
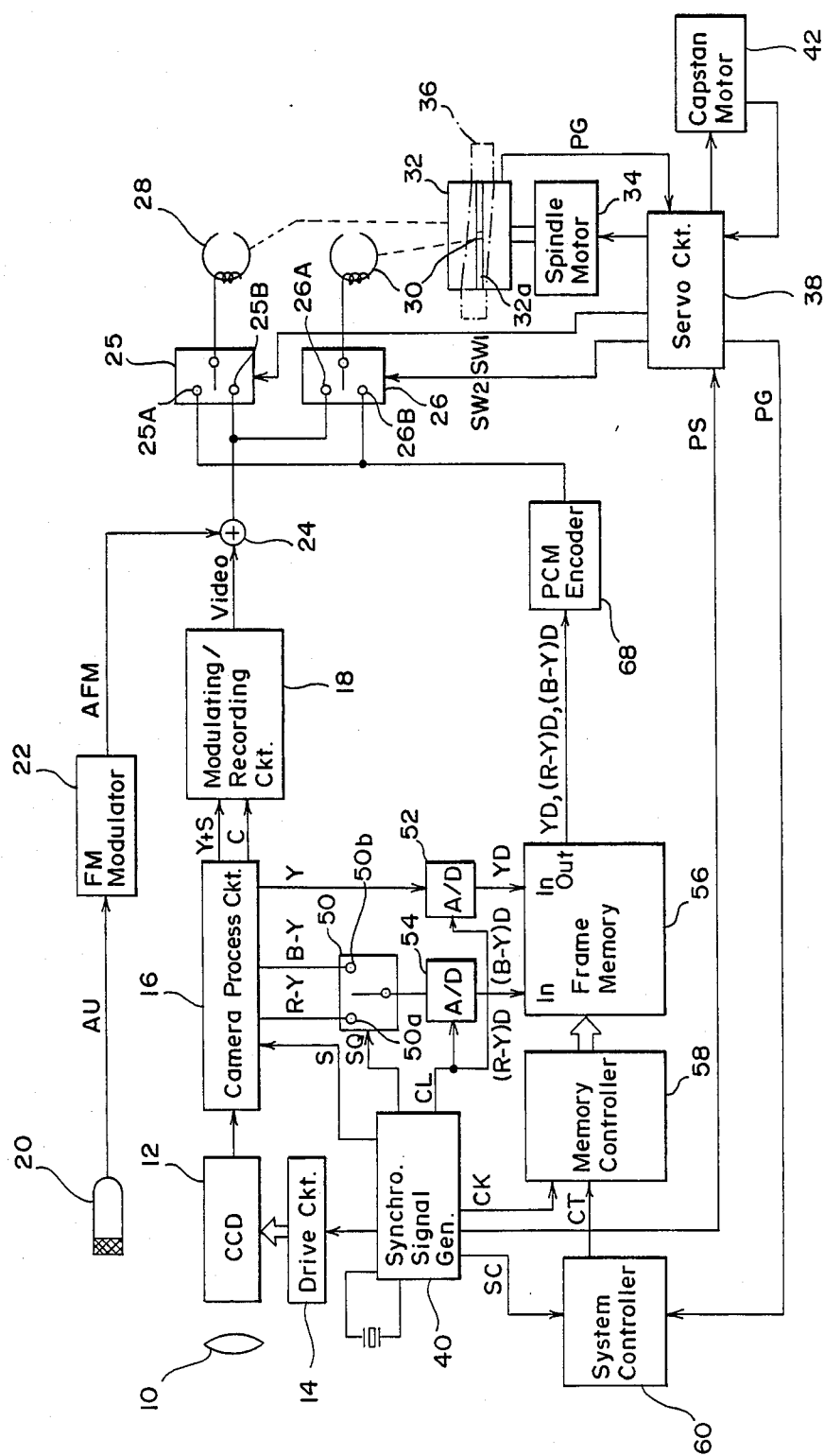
FIG. 3 is a block diagram showing the arrangement of essential components of an 8-mm video cassette recorder which is the first embodiment of this invention.

FIG. 3 shows the arrangement of essential components of an 8-mm video cassette recorder according to the embodiment of the invention.

In FIG. 3, light from an object is applied through a lens 10 to a CCD (charge-coupled device) 12 so that the image of the object is formed on the image pickup surface of the CCD 12. In the CCD 12, the image formed thereon is converted into electrical signals which are accumulated, and horizontal and vertical scanning operations are carried out with the aid of a drive circuit 14 to output video signals. The video signals thus output are supplied to camera process circuit 16, so as to be subjected to signal processing such as noise reduction and gamma correction.

The camera process circuit 16 supplies a luminance signal Y with a synchronizing signal S, and a color signal C to a modulating/recording circuit 18. In the circuit 18, the luminance signal Y is subjected to FM modulation, while the color signal C is subjected to frequency conversion, from 3.58 MHz to about 743 KHz, and to phase shifting (PI). As a result, the modulating/recording circuit 18 outputs a video signal Video which is obtained by mixing an FM luminance signal YFM and a low frequency conversion color signal Co. The video signal Video is applied to a mixer circuit 24, where it is mixed with an FM audio signal AFM output by an FM modulator 22. The output of the mixer circuit 24 is applied through changeover switches 25 and 26 to magnetic heads 28 and 30 alternately with the field period. In FIG. 3, reference numeral 20 designates a microphone to supply an audio signal AU to the FM modulator 22.

The magnetic heads 28 and 30 are fitted in a slit formed substantially in the middle of a cylinder 32 which is rotated by a spindle motor 34 at a speed of thirty revolutions per second which is equal to the frame frequency. A magnetic tape 36 obliquely wound on the cylinder 32 is advanced at a predetermined speed by a tape running mechanism such as a capstan, so that the magnetic tape 36 is obliquely scanned alternately by the magnetic heads 28 and 30 to record analog signals such as the video signals Video on the video tracks $TR_V$.

The cylinder 32 has a magnet piece and a stationary head (not shown) which produces a pulse PG representing the rotational phase of the magnetic heads 28 and 30. The pulse PG is applied to a servo circuit 38. In the servo circuit 38, the pulse PG is compared with a reference pulse PS produced by a synchronizing signal generating circuit 40. That is, the servo circuit 38 controls the spindle motor 34 so that the rotation of the heads is synchronous with the reference pulse PS, and also controls a capstan motor 42 so that the speed of running the magnetic tape 36 is maintained constant. The servo circuit 38 further operates to apply switch change-over signals SW1 and SW2 respectively to the switches 25 and 26.

The above-described components are commonly provided for the 8-mm video cassette recorder, being substantially similar to the video cassette recorder of VHS or beta system.

Now, the PCM still picture recording system of the embodiment will be described. The camera process circuit 16 outputs the luminance signal Y and color difference signals $R-Y$ and $B-Y$. These analog signals Y, $R-Y$ and $B-Y$ are converted into digital signals YD, $(R-Y)D$ and $(B-Y)D$ by a change-over switch 50 and A/D (analog-to-digital) converters 52 and 54 with sampling frequencies, for instance, in a ratio of 4:1:1 according to the component coding system, respectively. In the component encoding in the ratio of 4:1:1, in the change-over switch 50, the armature is tripped over the terminals 50a and 50b once while the luminance signal Y is sampled four times, so that the color difference signals $R-Y$ and $B-Y$ are each selected once in that period. This operation of the change-over switch 50 is effected in response to a change-over signal SQ from the synchronizing signal generator 40. The synchronizing signal generator 40 supplies a clock signal CL for sampling and A/D conversion to the A/D converters 52 and 54.

In the A/D conversion, the sampling frequency and the quantizing bit number greatly affect the picture quality, and therefore they must be higher than certain values; in other words, they should be at least in the Nyquist band. The sampling frequency should be higher than 2 MHz, preferably higher than 3 MHz. The quantizing bit number is at least five (bits) for the luminance signal $Y+S$, and three for the color difference signals $R-Y$ and $B-Y$. In this connection, it should be taken into consideration that, as the quantizing bit number increases, the processing circuit becomes more intricate, and the manufacturing cost also increases. In the embodiment, the quantizing bit number is set to eight (bits) because the digital data in the 8-mm video format are of 8-bits. For instance in the case where the still picture quality is such that (1) th frequency characteristic curve of the luminance signal Y is substantially flat up to 4.2 MHz and (2) the frequency characteristic curves of the color difference signals $R-Y$ and $B-Y$ are substantially flat up to 1.0 MHz, and a filter the ratio of "end of passband"/"start of stopband" of 1:1.3 is used, the sampling frequency is set to at least to 10.92 MHz:

$$4.2 \times 1.3 \times 2 = 10.92 \text{ MHz} \quad (1)$$

In the 8-mm video system, the quantity of data bits per field, that is, the quantity of data bits written in each PCM track $TR_P$, is set to 1050 words (one word being eight bits). Accordingly, if, in the PCM still picture recording operation of the embodiment, 1H part of the video signal is PCM-recorded in each PCM track $TR_P$, then in the case of the component coding in the ratio of 4:1:1, the sampling frequency fs for the luminance signal is set to 700 fH ($\dot= 11.01$ MHz) according to the following equation (2):

$$8(3/2 \times fs/fH) = 8 \times 1050 \quad (2).$$

This will satisfy the above-described condition (1). In this case, the sampling frequency fs/4 for the color difference signals R−Y and B−Y is set to 175 fH ($\dot= 2.75$ MHz). On the other hand, 2H part of the video signal is PCM-recorded every revolution of the cylinder 32. therefore, in the case where the number of effective scanning lines per frame is 420, a picture of one frame is PCM-recorded as a still picture in seven (7) seconds.

The digital signals YD, (R−Y)D and (B−Y)D output by the A/D converters 52 and 54 are inputted for one frame into a frame memory 56 at a write speed synchronous with the sampling frequency fs. And, in order that, when the magnetic head 28 or 30 scans the PCM track $TR_P$, 1H part of the video signal is PCM-recorded therein, the digital signals YD, (R−Y)D and (B−Y)D corresponding to the 1H part are output from the frame memory 56 at a predetermined speed and supplied to a PCM encoder 68 (described later). Thus, in the frame memory 56, the digital signals YD, (R−Y)−D and (B−Y)D are read for 1H part during the head scanning period of 36°, and the signals for one frame are read out, for instance, in seven (7) seconds; that is, the digital signals are subjected to time axis expansion. The above-described data writing and reading operation of the frame memory 56 is controlled by a memory controller 58, to which a clock signal CK and a control signal CT are applied by the synchronizing signal generating circuit 40 and a system controller 60, respectively.

The PCM encoder 68 is commercially available for the 8-mm video cassette recorder. In the PCM encoder 68, similarly as in the PCM audio recording operation, error correction and modulation are carried out. That is, cross interleave codes of 8-words 2-parities are used as error correcting codes, and addresses, synchronizing signals and parities are added to data. Furthermore, error detecting CRC codes are also added. The data include the video signal, and ID words for indexing. Accordingly, in the case of the embodiment, the ID words may be utilized, for instance, for detecting the beginning of a still picture. Furthermore, a biphase modulation which is a kind of FM modulation is employed for modulation, so that the recording system following the PCM encoder 68 can be used for both analog signals and PCM signals.

The digital signals YD, (R−Y)D and (B−Y)D are converted 1H at a time by the PCM encoder 68 into PCM signals with error correcting codes, which are applied through the change-over switches 25 and 26 to the magnetic heads 28 and 30 so as to be recorded on the PCM tracks $TR_P$. The change-over signals SW1 and SW2 are supplied from the servo circuit 38 to the change-over switches 25 and 26, so that the switches are closed alternately every head scanning period. That is, when the tape 36 is scanned by the magnetic head 28, the switch 25 is closed whereas the switch 26 is opened. More specifically, in the PCM recording period (or PCM track scanning period) the armature of the switch 25 is tripped over to the terminal 25A to supply the PCM signal from the PCM encoder 68 to the head 28, and in the following motion picture recording period (or video track scanning period) the armature is tripped over to the terminal 25B to supply the analog video signal Video and the FM audio signal AFM from the mixer 24 to the head 28. Similarly, when the tape 36 is scanned with the head 30, the armature of the switch 26 is tripped over to the terminals 26A and 26B successively, whereas the switch 25 is maintained opened.

The system controller 60 receives the system clock SC from the synchronizing signal generating circuit 40 and a head phase pulse PG from the servo circuit 38, and issues instructions to the memory controller 58 to effect the writing or reading operation of the frame memory 56, and controls other circuits in the system.

In FIG. 3, a circuit for recording the tracking pilot signal TPS is not shown.

The PCM still picture recording operation of the embodiment will be described with reference to FIG. 4.

Figure 4:
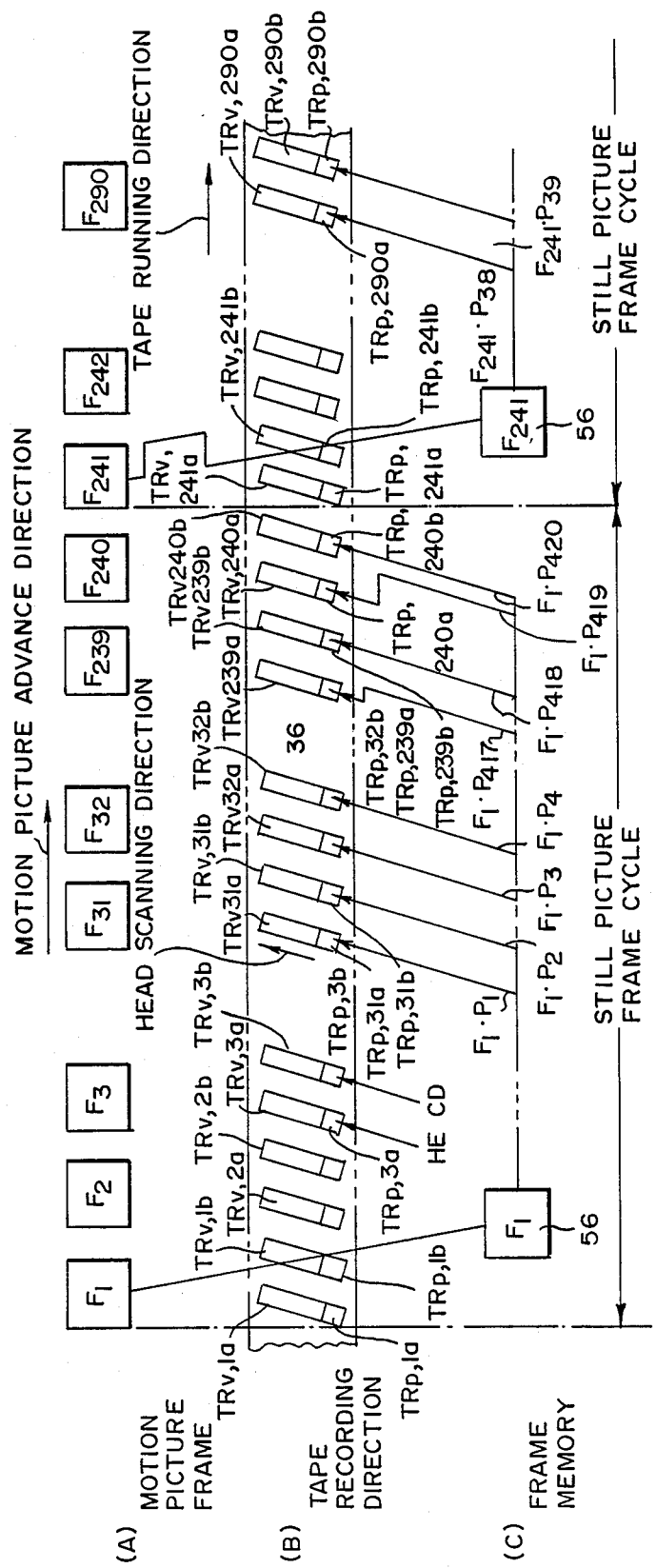
FIG. 4, (A)-(C), is a diagram for a description of a PCM still picture recording operation in the embodiment shown in FIG. 1.

The part (A) of FIG. 4 shows the fact that pictures picked up by the CCD 12 alter by frame in the order of F1, F2, F3 and so on, thus forming a motion picture, the frame pictures Fi being recorded in the form of analog video signals Video on continual video tracks $TR_{Vi a}$, and $TR_{V,ib}$ of the magnetic tape 36 as shown in the part (B) Of FIG. 4.

In the embodiment, the PCM still picture recording operation is carried out with a constant period TC. In FIG. 4, the PCM still picture recording operation is performed with a period of 240 frames in the order of F1, F241 and so forth; i.e., a period of eight (8) seconds.

First, the frame picture F1 is fed into the frame memory 56 as shown in the part (C) of FIG. 4. That is, the analog video signals Y, R−Y and B−Y representing the frame picture F1 are converted into digital signals YD, (R−Y)D and (B−Y)D with the predetermined sampling frequencies and quantizing bit number, which are inputted into the frame memory 56. This data inputting operation for one frame is carried out under the control of the system controller 60.

The frame picture F1 thus fed into the frame memory 56 is recorded in increments of 1H in the form of PCM signals in a plurality of Continual PCM tracks $TR_{Pi}$ and $TR_{Pj}$. In the embodiment, the number of effective scanning lines is 420. Therefore, PCM signals F1·P1 through F1·P420 are recorded in 420 PCM tracks $TR_{P,31a}$ through $TR_{P,240b}$, respectively, and the recording time is seven (7) seconds. In thirty PCM tracks $TR_{P,1a}$ through $TR_{P,30b}$ (corresponding to one second) before the PCM track TRP,31a, no still picture data are recorded, but a header HE or control data CD are recorded.

When the PCM still picture recording of the frame picture F1 has been accomplished, the next still picture frame cycle TC occurs. In the cycle, similarly as in the above-described case, the frame picture F241 is PCM-recorded, as a still picture, on 420 PCM tracks.

As was described above, in the embodiment, while a motion picture is continuously recorded according to the 8-mm video format, one frame (one frame picture Fi) of the motion picture is selected with the predetermined period and PCM-recorded, as a still picture, on the PCM tracks (regions) in the 8-mm video format.

If the heads 28 and 30 or the reproducing heads are rotated irregularly in speed or the magnetic tape 36 is expanded or contracted or run irregularly, then the reproduced signals suffer from jitter. However, during the PCM reproduction, the jitter is effectively removed from the PCM signals reproduced from the PCM tracks, and therefore the still picture reproduced is free from swing and distortion. The still picture is formed according to a method in which the PCM signals of 1H read from the 420 PCM tracks are combined and subjected to PCM demodulation and D/A conversion to form a standard analog video signal for one frame.

If, in a VTR (video tape recorder), the magnetic tape or the heads have scratches or dust, then dropout occurs unavoidably. However, this difficulty is satisfactorily eliminated by the powerful error correcting function of PCM. For instance when the redundancy of the error correcting code is set to 40%, the effect of dropout is substantially eliminated, so that a satisfactory still picture is reproduced. Furthermore, a variety of picture quality lowering phenomena accompanying analog recording are virtually eliminated with the still picture PCM-recorded in the embodiment. Thus, the invention is excellent in the preservation of record and in the repeatability of reproduction.

As was described above, in the embodiment, while a motion picture is being taken, one frame of the motion picture is automatically PCM-recorded with a predetermined period. Therefore, when the frame thus PCM-recorded is displayed on the television set or formed into a hard copy through PCM reproduction, then the resultant still picture is substantially as high in picture quality as photographic pictures. Furthermore, the frame is PCM-recorded with the same magnetic heads 28 and 30 and magnetic tape 36 that are used for recording motion pictures, which eliminates not only the necessity for special mechanisms but also any increase in weight or in size. Furthermore, the PCM tracks in the 8-mm video system are utilized; more specifically, a still picture is PCM-recorded in the PCM tracks according to the PCM format which is substantially the same as that in the PCM audio recording system, and therefore the PCM encoder for PCM audio recording operation can be used, as it is, for recording still pictures. This contributes greatly to reduction of the manufacturing cost.

Thus, the 8-mm video cassette recorder of the invention is a camera recorder which is lightweight, low in manufacturing cost, high in picture quality, and has functions of a still camera, and can be conveniently used.

While the invention has been described with reference to its preferred embodiment, the invention is not limited thereto or thereby and it will be obvious to those skilled in the art that various changes and modifications may be made therein without departing from the invention. For instance, the sampling period, the quantizing characteristic, and the recording time mode can be changed when necessary. Such modifications are for instance as indicated in FIG. 5.

In FIG. 5, Specification A is for the above-described embodiment.

In Specification B, no H blank (horizontal blanking period) is recorded, and the picture quality is specified high, so that the sampling frequency is increased as much. However, the effective picture element (PIXEL) number, the recording PCM track number, and the recording time are the same as those in Specification A.

In Specification C, the color difference signals R−Y and B−Y are recorded alternately every 1H, and video signals for 2H are PCM-recorded in one PCM track under the condition that no H blank is recorded. In Specification C, the recording PCM track number and the recording time are reduced to half; however the resultant picture is relatively rough in quality because of the low sampling frequency.

In Specification D, the conditions are the same as those in Specification C; however, the sampling frequencies are set to higher values to improve the picture quality, and therefore the recording PCM track number and the recording time are slightly increased accordingly.

Only four specifications have been described; however, other specifications are, of course, available. In the above-described embodiment, the PCM still picture recording operation is carried out by the frame; however, it is possible to perform the recording operation by the field.

As is apparent from the above description, the technical concept of the invention is effectively applied to an 8-mm video cassette recorder; however, the invention is applicable not only to camera recorders of other standards but also to portable separable video tape recorders, and to so-called "fixed video tape recorders" so that television pictures can be PCM-recorded as still pictures.

As was described above, in the magnetic recording device of the invention, while a motion picture is being recorded, part of the motion picture which corresponds to one unit such as one frame or field is extracted and PCM-recorded as a still picture with a predetermined period. Thereafter, for instance, in the case of a camera recorder- while a motion picture is being taken, one frame of the motion picture is PCM-recorded periodically, and therefore when the frame thus recorded is reproduced on a television screen or as a hard copy, the resultant still picture is appreciably high in picture quality.

Furthermore, in the invention, the PCM still picture recording operation is carried out with the same magnetic heads and magnetic tape that are used for recording motion pictures, and therefore it is unnecessary to employ special mechanisms. Accordingly, the magnetic recording device of the invention is lightweight and low in manufacturing cost and is well balanced in arrangement. Especially, application of the technical concept of the invention to an 8-mm video format can be employed as they are.

Figure 6:
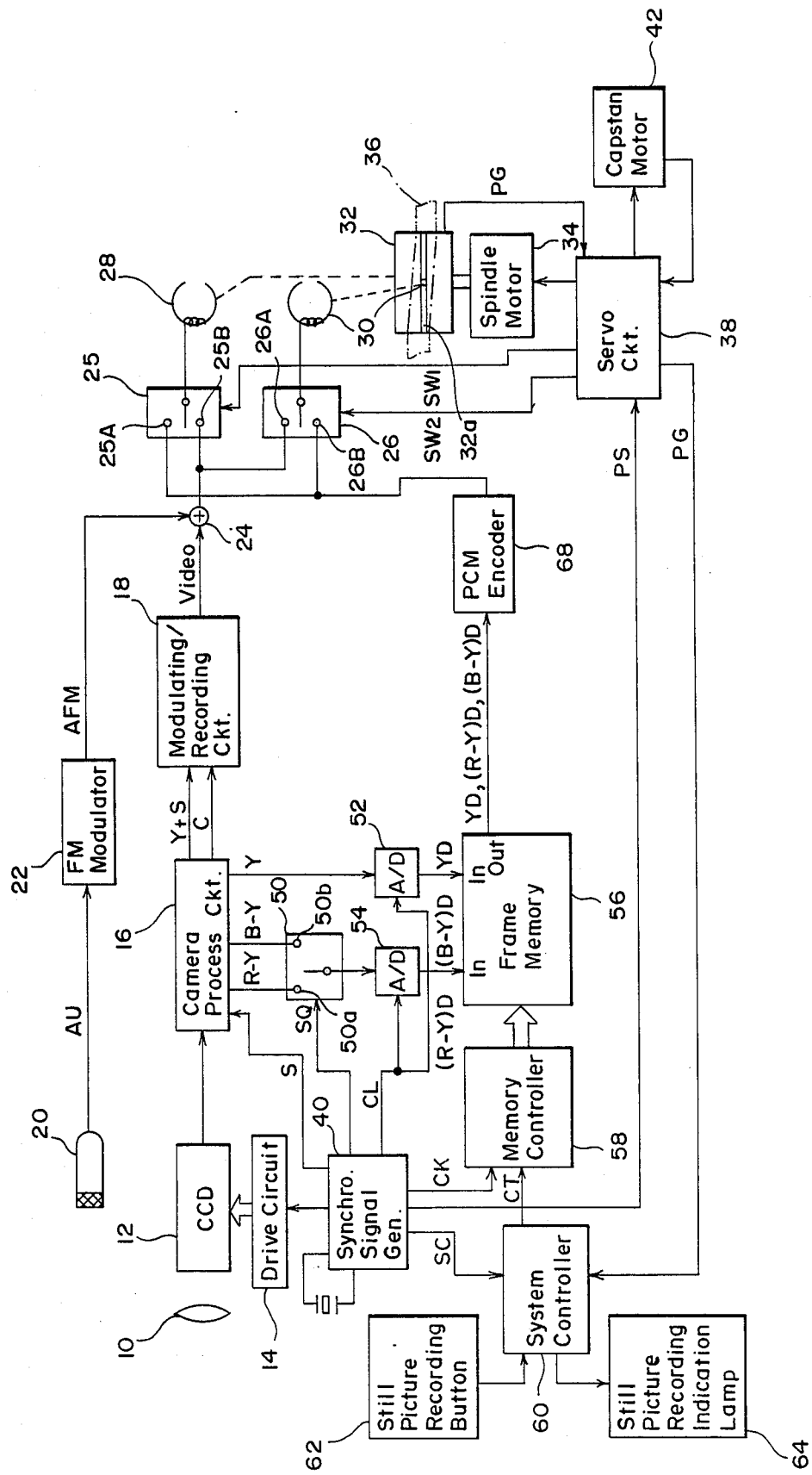
FIG. 6 is a block diagram showing the second embodiment of the present invention.

In order to issue an operation instruction signal to the system controller 60, a still picture recording button 62 may be provided to the outside of the camera housing as shown in FIG. 6. In the embodiment of FIG. 6, the writing or reading operation of the frame memory 56 is effected in response to the operation instruction signal. A still recording indication lamp 64 is provided in a view finder, so that it is turned on during the PCM still picture recording operation to thereby indicate that the PCM still picture recording operation is now being carried out.

Figure 7:
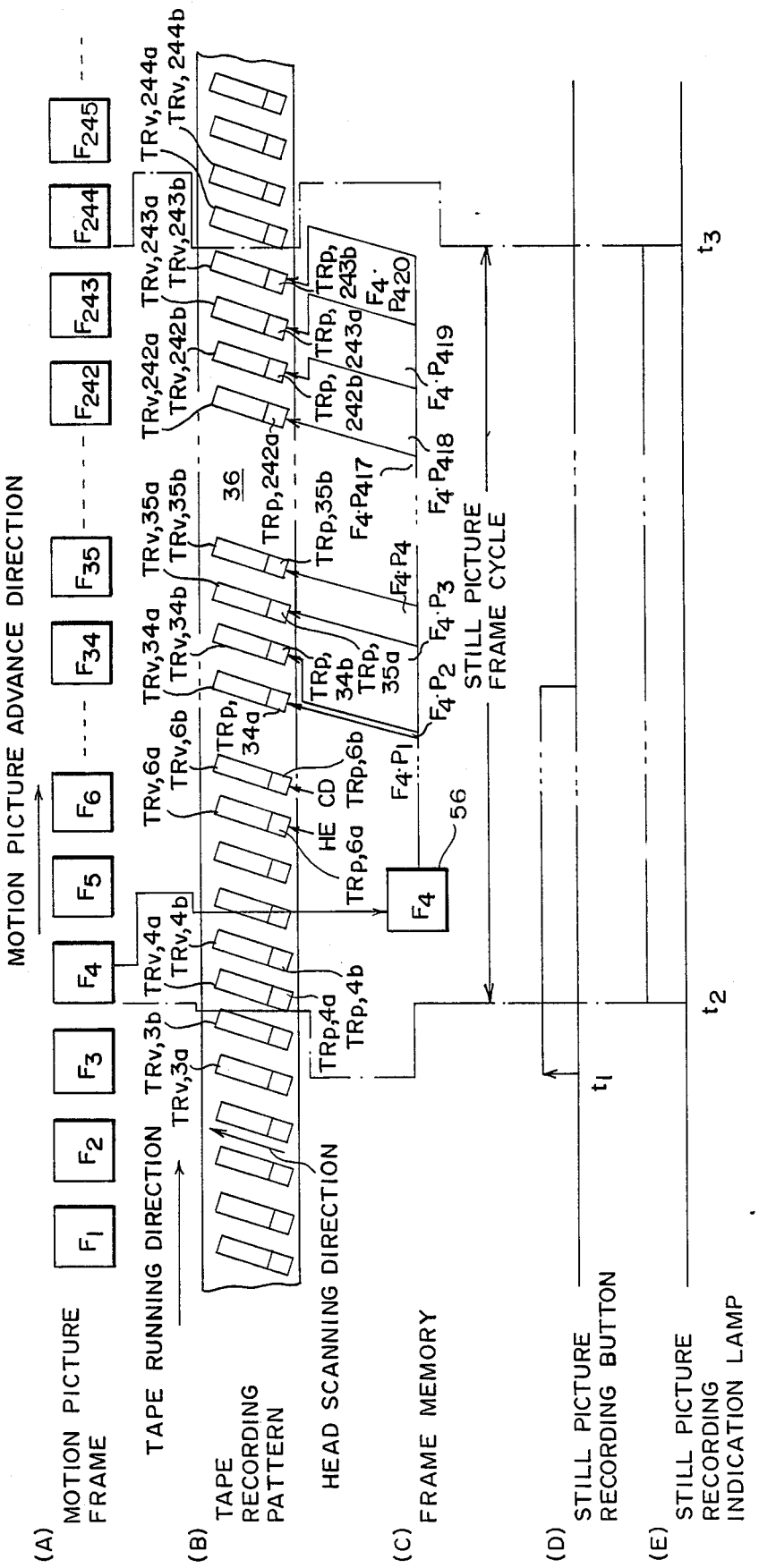
FIGS. 7 to 9 are diagrams for a description of a PCM still picture recording operation in the second embodiment of FIG. 6.

In this embodiment, the PCM still picture recording operation is carried out in response to the operation of the still picture recording button 62. In FIG. 7, the still picture recording button 62 is depressed at the time instant $t_1$. At this instant, the frame picture F3 is being recorded. In response to the operation of the button, the system controller 60 issues an instruction signal to the memory controller at the time instant $t_2$ when recording of the next frame picture F4 starts, so that the writing operation of the frame memory 56 is effected. The time instant $t_2$ when the recording operation is started is based on the head phase pulse PG from the servo circuit 38. From the time instant $t_2$ on, the digital signals YD, (R−Y)D and (B−Y)D representing the frame picture F4 are stored in the frame memory 56. At the same time, the system controller 60 turns on the still picture recording lamp 64.

The digital signals YD, (R−Y)D and (B−Y)D thus stored are recorded by in increments of 1H, in the form of a PCM signal, in a plurality of continual PCM tracks $TR_{P,i}$ and $TR_{P,j}$ in a predetermined period of time. In this embodiment, the number of effective Scanning lines is 420. Therefore, the PCM signals (of 1H) F4·P1 through F4·P420 are recorded in 420 PCM tracks $TR_{P,34a}$ through $TR_{P,243b}$, respectively, and the recording time is seven (7) seconds. No still picture data are recorded in the thirty PCM tracks $TR_{P,4a}$ through $TR_{P,33n}$ (corresponding to the lapse of one second) located before the PCM track $TR_{P,33a}$; however, a header HE and a control data CD are recorded therein.

When the PCM still picture recording operation of the frame picture F4 is accomplished at the time instant $t_3$, the system controller 60 turns off the still picture recording lamp 64, thus notifying the operator of the fact that the next still picture recording operation can be carried out; that is, the still picture recording button 62 can be depressed. When the button 62 is depressed after the lamp 64 has turned off, the frame picture Fi occurring immediately after the operation of the button 62 is PCM-recorded as a still picture similar to the case of the frame picture F4.

When the still picture recording button 62 is depressed while the still picture recording lamp 64 is on, the depression of the button is made ineffective by the system controller 60.

As was described above, during the recording operation of a motion picture, a desired frame of the motion picture can be PCM-recorded by depressing the still picture recording button 62. Therefore, when the frame thus PCM-recorded is displayed on the television set or formed into a hard copy through PCM reproduction, then the resultant still picture is substantially as high in picture quality as a photographic picture. Furthermore, the frame is PCM-recorded with the same magnetic heads 28 and 30 and magnetic tape 36 that are used for recording motion pictures, which eliminates not only the necessity for special mechanisms but also eliminates any increase in weight or in size. Furthermore, the PCM tracks in the 8 mm video system are utilized; more specifically, a still picture is PCM-recorded in the PCM tracks according to the PCM format which is substantially the same as that in the PCM audio recording operation and thus can be used, as it is, for recording still pictures. This contributes greatly to reduction of the manufacturing cost.

Thus, the 8-mm video cassette recorder of the invention is a camera recorder which is lightweight, low in manufacturing cost, and high in picture quality, and has function of a still camera, and can be conveniently used.

In the above-described embodiment, when the still picture recording button 62 is depressed while the still picture recording lamp 64 is kept turned on i.e., the PCM still picture recording operation is being carried out, the depression of the button is made ineffective; however, the magnetic recording device may be so modified that the depression of the button is accepted during the PCM still picture recording operation. In the modification, the PCM still picture recording operation is suspended, and the frame picture Fi occurring immediately after th operation of the button is PCM-recorded as a still picture. In the PCM still picture recording operation of the frame picture Fi, data indicating that the preceding PCM still picture recording operation has been suspended is included in the header HE.

In the above-described embodiment, the exposure time is equal to that of an ordinary video camera, 1/30 second or 1/60 second. However, if the device is provided with a high speed shutter, then a moving object can be PCM-recorded as a still picture higher in picture quality.

Figure 8:
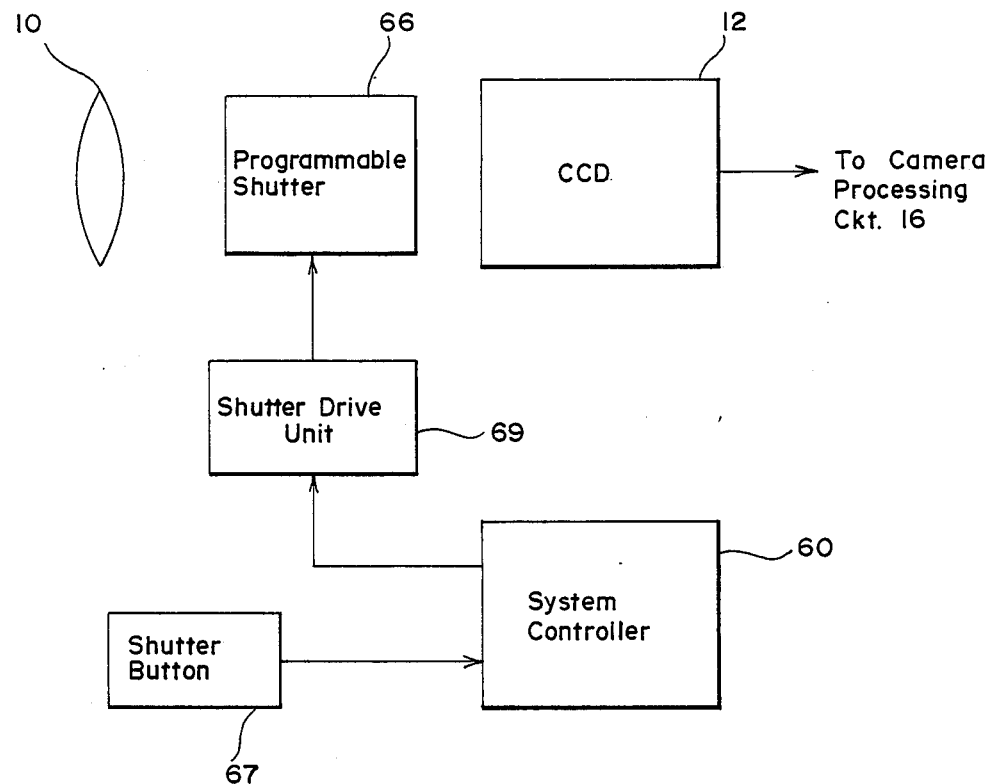

FIG. 8 shows the arrangement of essential components of another embodiment of the invention provided with a shutter mechanism. Components not shown in FIG. 8 are equal to those which have been described with reference to FIG. 6. In FIG. 8, reference numeral 66 designates a programmable shutter serving also as an aperture blade. The shutter 66 is driven by a shutter drive section 69 in response to an instruction signal from the system controller 60. A shutter button 67 corresponds to the still picture recording button of the above-described embodiment.

Figure 9:
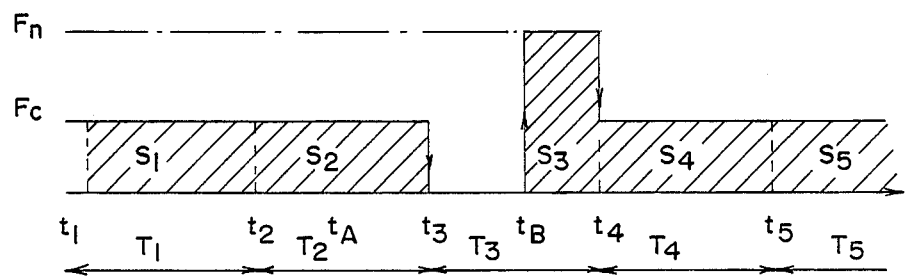

FIG. 9 is a time chart for a description of the operation of the shutter 66 in the embodiment (or modification). In FIG. 9, reference characters $t_1$, $t_2$, $t_3$ and so on designate the start time instant of frame periods T1, T2, T3 and so on (=1/30 Second), and $t_A$, the time instant when the shutter button 67 is depressed. In the frame period T3 occurring immediately after the shutter operation time instant $t_A$, at the start time instant $t_3$ the shutter 66 is closed from its aperture value Fc in a steady mode, and at the predetermined time instant $t_B$ the shutter 66 is opened to an aperture value Fn. The aperture value Fn is determined according to the exposure time $t_B - t_4$ so that the total exposure value S3 in the frame period T3 is equal to the exposure values S1, S2, S4, ... of the other exposure periods T1, T2, T4, ...... At the end of the frame period T3, the video signal output by the CCD 12, after being digitized, is stored in the frame memory 56 for the PCM still picture recording operation.

If the shutter 66 is provided to reduce the exposure time as was described above, then the resultant still picture is higher in picture quality. Although the shutter 66 is opened and closed, the exposure value per frame period is maintained constant at all times, and therefore a motion picture can be recorded smoothly at all times.

In the magnetic recording device of the invention, the PCM still picture recording operation can be carried out after a motion picture recording operation according to the after-recording system. In this case, a still picture of a scene different from that of the motion picture can be recorded.

Modifications as indicated in FIG. 5 may be possible to this embodiments of FIG. 6.

In addition to the effects obtained by the embodiment of FIG. 3, in the above magnetic recording device of the invention, while a motion picture is being recorded, a unitary picture component, such as a frame or field, of the motion picture is, when necessary, extracted and PCM-recorded as a still picture according to the after-recording system. Therefore, for instance in the case of a camera recorder, not only can a motion picture be recorded, but also a still picture can be recorded when necessary. When the picture component thus recorded is reproduced on a television screen or formed as a hard copy, the resultant still picture is appreciably high in picture quality.

The above described operation with reference to FIGS. 6 and 7 is for a steady mode. Next, the operation in an interruption mode will be described with reference to FIG. 10. The interruption PCM still picture recording operation is started in response to the operation of the still picture recording button 62 for interruption.

Figure 10:
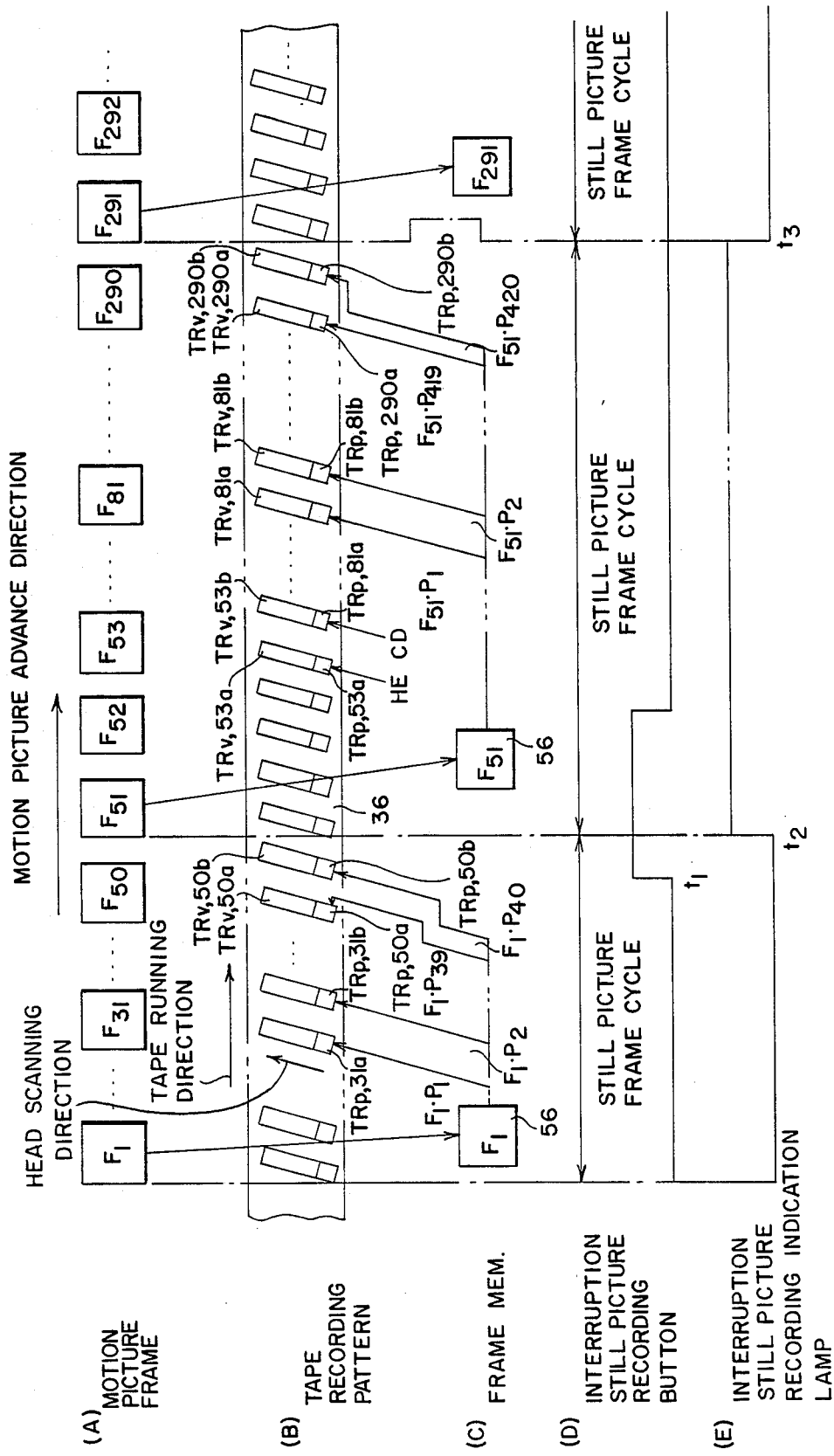
FIG. 10, (A)-(E), is an explanatory diagram for a description of the third embodiment of the present invention.

In FIG. 10, the interruption still picture recording button 62 is depressed at the time instant $t_1$. At this instant, the frame picture F50 is recorded as a motion picture, and the frame picture F1 is PCM-recorded as a still picture.

In response to the depression of the button 62, the system controller 60 issues an instruction to the memory controller 58 at the time instant $t_2$ when recording of the next frame picture F51 is started, so that the reading operation of the frame memory 56 is suspended, and instead the writing operation is effected. The time instant $t_2$ for switching the reading and writing operations is based on the head phase pulse PG output by the servo circuit 38. From the time instant $t_2$ on, the digital signals YD, (R−Y)D and (B−Y)D representing the frame picture F51 are inputted into the frame memory 56. At the same time, the system controller 60 turns on the interruption still picture recording lamp 64.

The digital signals YD, (R−Y)D and (B−Y)D thus inputted are recorded in increments of 1H, in the form of a PCM signal, in a plurality of continual PCM tracks $TR_{P,81a}$ through $TR_{P,290b}$ in a predetermined period of time (one second). The data that the preceding still picture frame cycle Tc has been suspended is included in the header HE which is recorded prior to the still picture.

When PCM still picture recording operation of the frame picture F51 has been accomplished at the time instant $t_3$, the system controller 60 starts another still picture frame cycle Tc in the steady mode so that the frame picture F291 occurring immediately after the time instant $t_3$ is stored in the frame memory 56. On the other hand, system controller 60 turns off the interruption still picture recording lamp 64 thereby to notify the operator of the fact that the next interruption still picture recording operation may be made; that is, the interruption still picture recording button 62 may be depressed. Therefore, when the button 62 is depressed after the lamp 64 has been turned off, the frame picture Fi occurring immediately after the depression of the button 62 is PCM-recorded as a still picture similar to the recording of the frame picture F51.

The system controller 60 is so designed that, even if the interruption still picture recording operation is depressed while the interruption still picture recording lamp 64 is turned on, it is made ineffective.

As was described above, when the interruption still picture recording button 62 is depressed, the current still picture frame cycle Tc is suspended, and instead a new (interruption) still picture frame cycle Tc' for one frame (one frame picture Fi) occurring immediately after the depression of the button is started. At the end of the interruption still picture frame cycle Tc', a still picture frame cycle Tc in the steady mode starts. And the still picture frame cycle Tc occurs repeatedly until the button is operated again. It should be noted that even if the button is depressed, the motion picture is continuously recorded according to the 8-mm video format.

As is apparent from the above description, both in the steady mode and in the interruption mode, a frame of a motion picture is -PCM-recorded as a still picture in the PCM tracks according to the 8-mm video format.

Figure 11:
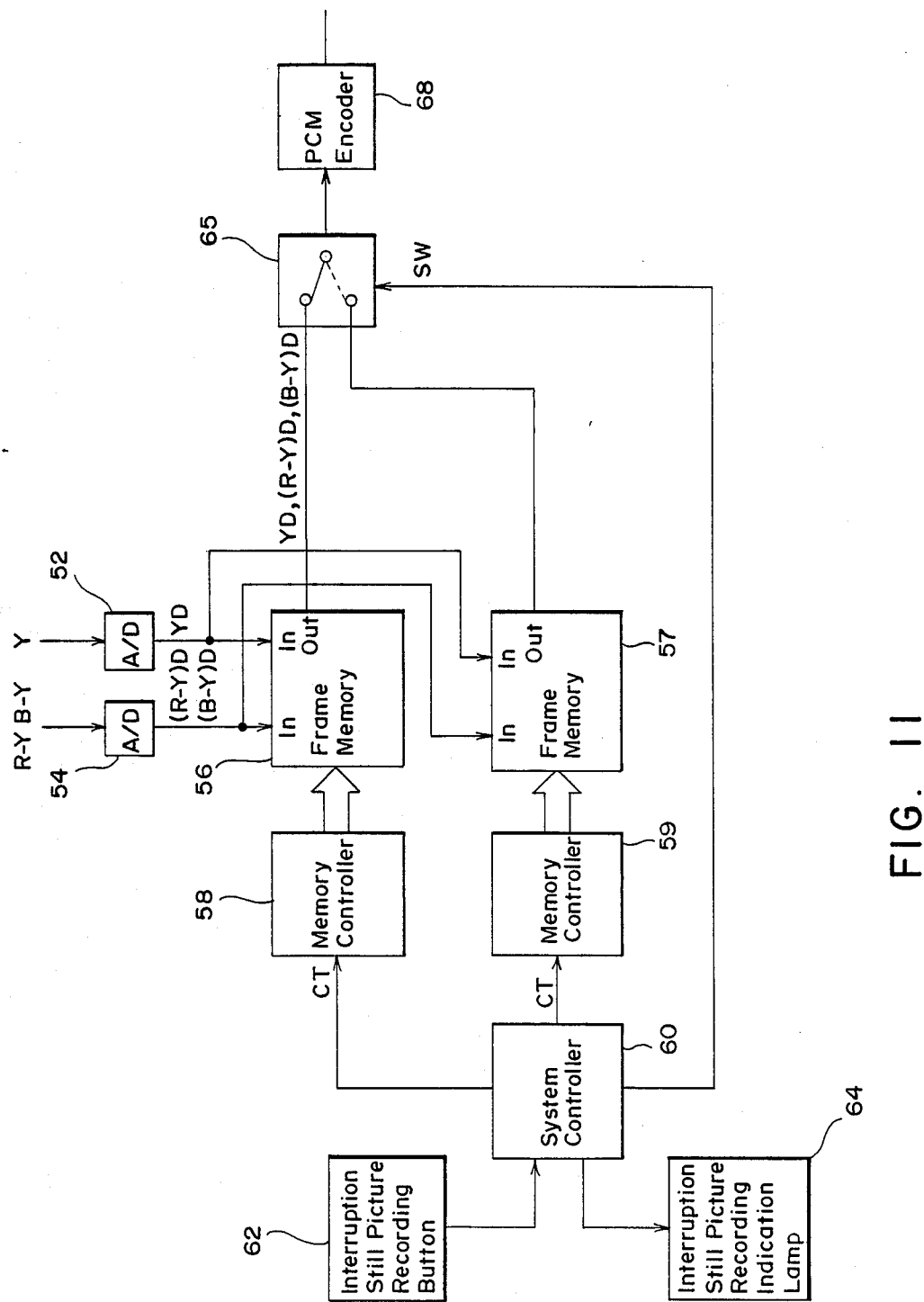
FIG. 11 is a block diagram showing a detail of the fourth embodiment of the present invention.

FIG. 11 shows the arrangement of essential components of an 8-mm video cassette recorder which is a third embodiment of the invention. Its components not shown in FIG. 11 are same as those which have been described with reference to FIG. 6.

In the third embodiment, upon interruption, a frame of a motion picture is extracted, but the still picture frame cycle Tc is not suspended; that is, after the cycle Tc, the frame extracted in response to the interruption is PCM-recorded as a still picture.

As shown in FIG. 11, a frame memory 57 is added, and accordingly a memory controller 59 and a change-over switch 65 are additionally provided. In the second embodiment thus organized, the frame memories 56 and 57 can perform their writing and reading operations selectively, and the switch 65 operates in response to a change-over control signal SW from the system controller 60 in such a manner that the armature is tripped over to a terminal 65a in the reading operation of the frame memory 65 and to a terminal 65b in the reading operation of the frame memory 57.

Figure 12:
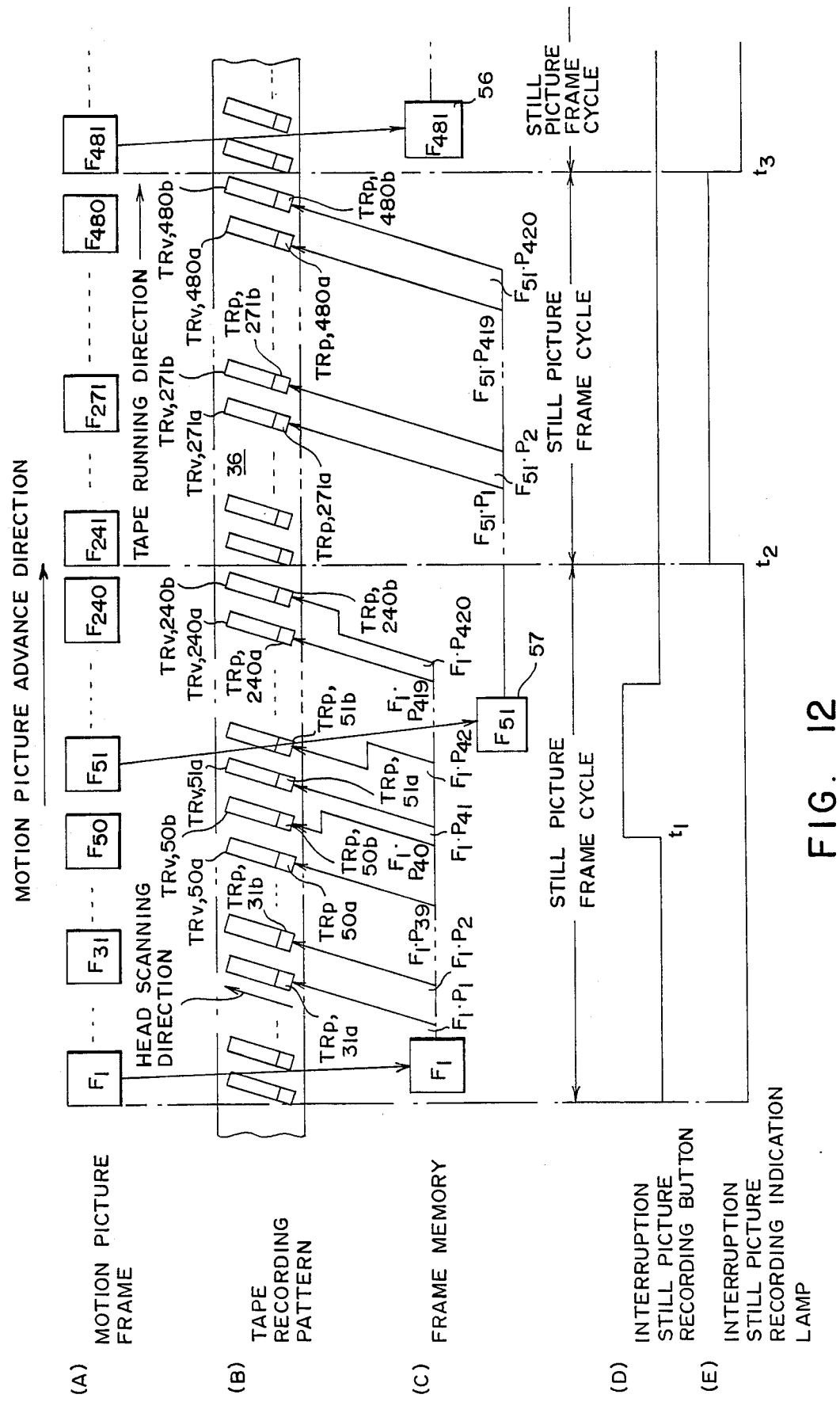
FIG. 12, (A)-(E), is an explanatory diagram for a description of the fourth embodiment of FIG. 11.

The operation of the third embodiment in the interruption mode will be described with reference to FIG. 12. Similar to the case of FIG. 6, the interruption still picture recording button 62 is depressed at the time instant $t_1$. At this instant, the frame picture F50 is recorded as a motion picture, and the frame picture F1 is PCM-recorded as a still picture, with the armature of the switch 65 (FIG. 11) tripped over to the terminal 65a.

In response to the depression of the button 62, the system controller 60 supplies an instruction signal to the memory controller 58 at the time instant when the next frame picture F51 is recorded, so that the writing operation of the frame memory 57 is effected, and causes the memory controller 58 to continue the reading operation of the frame memory 56. As a result, the digital signals YD, (R−Y)D and (B−Y)D representing the frame picture F51 are stored in the frame memory 57. On the other hand, the PCM still picture recording operation of the frame picture F1 is continued, and the interruption still picture recording lamp 64 is not turned on yet.

When the PCM still picture recording operation of the frame picture F1 is accomplished at the time instant $t_2$, the system controller 60 operates to trip the armature of the switch 65 to the terminal 65b and to turn on the interruption still picture recording lamp 64, and then in a predetermined period (one second) issues an instruction signal to the memory controller 58 so that the reading operation of the frame memory 57 is effected. As a result, the digital signals YD, (R−Y)D and (B−Y)D representing the frame picture F51 are read by 1H out of the frame memory 57, thus being recorded in the form of a PCM signal in a plurality of continual PCM tracks tr$_{P,271a}$ through TR$_{P,480b}$.

When the interruption still picture frame cycle Tc' is ended at the time instant t$_3$, another still picture frame cycle Tc in the steady mode is started, and the frame picture F481 occurring immediately after the time instant t$_3$ is stored in the frame memory 56.

When the interruption still picture recording button 62 is depressed during the interruption still picture frame cycle Tc', the frame memory 56 is empty. Therefore, the device may be so designed that, in this case, the operation of the button 62 is accepted so that a new frame picture Fi for interruption is stored in the frame memory 56. In this case, at the time instant t$_3$, the system controller 60 operates to trip the armature of the switch 65 over to the terminal 65a and to issue an instruction signal to the memory controller 58 so that the reading operation of the frame memory 56 is effected. Furthermore, the system controller 60 maintains the interruption still picture recording lamp 64 turned on until the next recording operation in the steady mode. It should be noted that modifications as shown in FIG. 5 are also possible.

In the above described embodiments, if in the case when an instruction to suspend a motion picture recording operation during a PCM still picture recording operation is given, the operation mode is switched over to the stop mode, then the PCM still picture recording operation is suspended. In order to overcome this difficulty, in the fourth embodiment of the present invention, even if such an instruction is issued, the PCM still picture recording operation of the unitary picture component selected is continued to complete the recording of the field or frame still picture.

Figure 13:
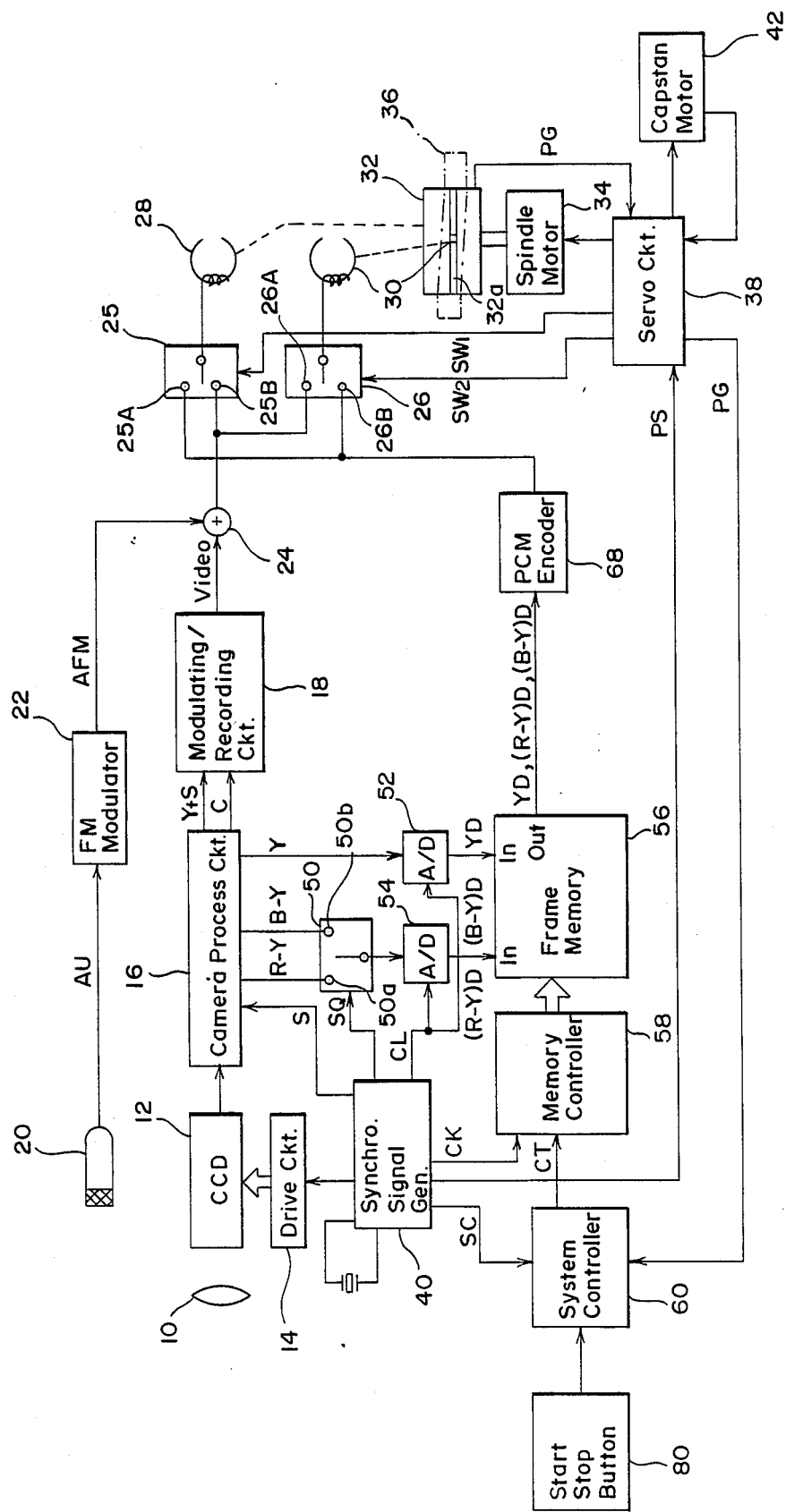
FIG. 13 is a block diagram showing the fifth embodiment of the present invention.

The fourth embodiment will be described with reference to FIGS. 13 to 15. In FIG. 13, the system controller 60 controls various circuit elements in response to the operation of a start/stop button 80 installed on the outside of the camera housing so that the recording operation can be alternately started and stopped. When the recording operation stopping instruction is given, as is described later, the present still picture frame cycle is not suspended; that is, the operating mode is switched over to the temporary stop mode after the present still picture frame cycle is completed.

In FIG. 13, a circuit for recording the tracking pilot signal TPS is not shown.

The PCM still picture recording operation in the embodiment will be described with reference to FIGS. 2 and 3.

Figure 14:
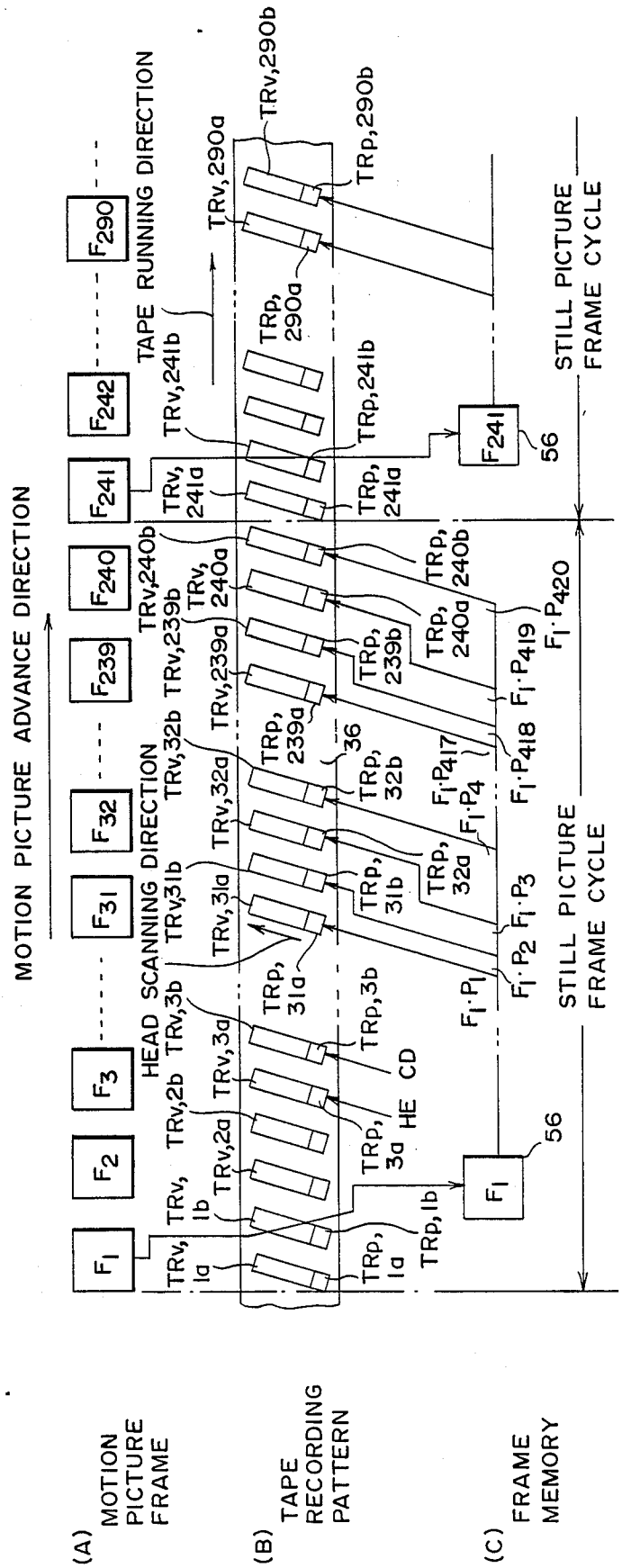
FIG. 14 A-C and 15(A)-(D) are explanatory diagrams for a description of the fifth embodiment of FIG. 13.

In FIG. 14, the start/stop button 80 is depressed at the time instant to (the part (D) of FIG. 14). In response to the depression of the button 80, the system controller 60 starts the recording mode. The operation otherwise is substantially same as described for previous embodiments.

When the PCM still picture recording operation of the frame picture F1 is accomplished in eight seconds, the next still picture frame cycle Tc occurs. In the cycle, the frame picture F241 is PCM-recorded as a still picture in 420 PCM tracks similar to the above-described case.

Figure 15:
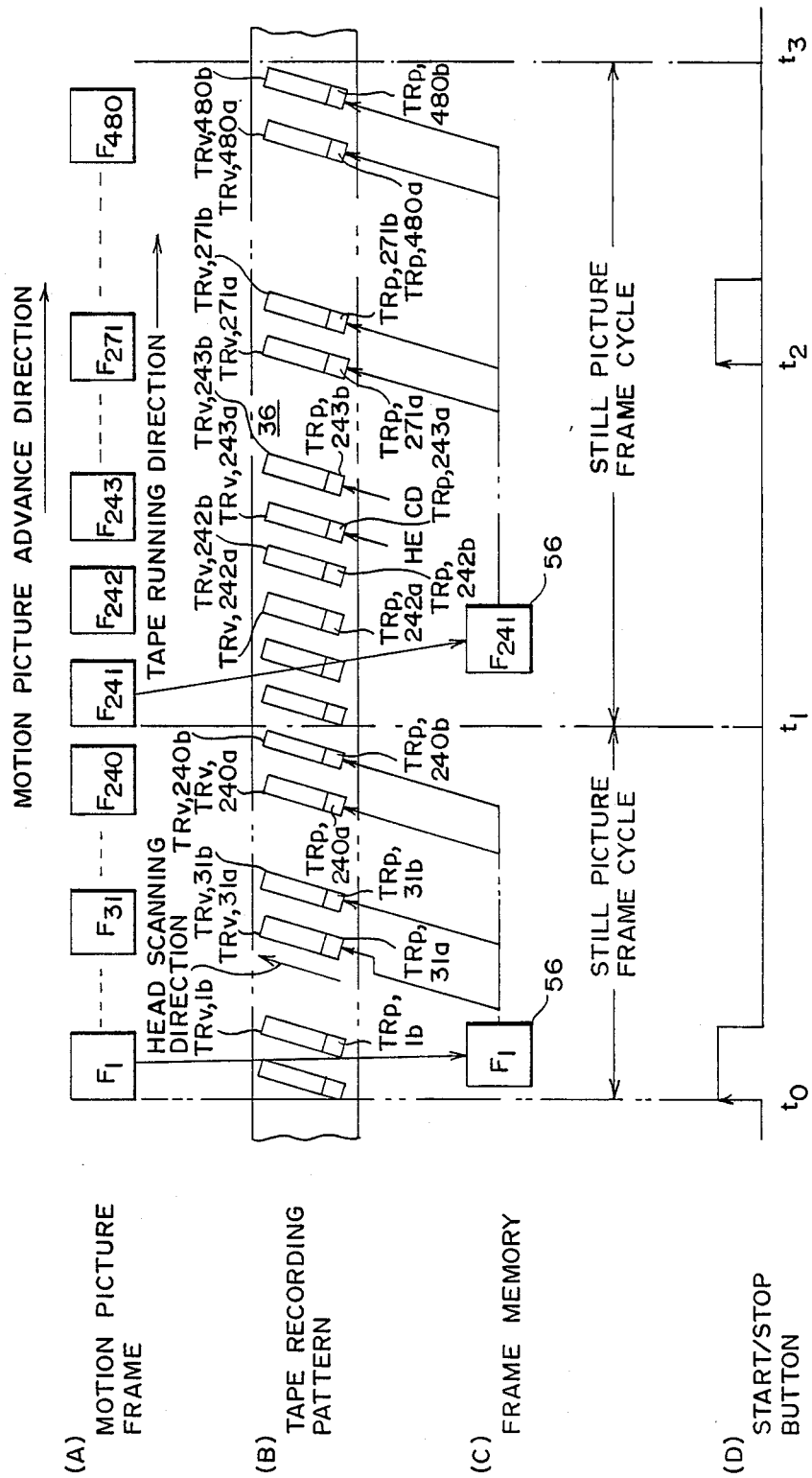

As shown in FIG. 15, when the start/stop button 80 is depressed at the time instant t$_2$ in the still picture frame cycle Tc of the frame picture F241, the recording operation is not immediately stopped; that is, the operation mode is switched over to the stop mode at the time instant t$_3$ when the frame cycle Tc is completed. In the stop mode, the magnetic tape 36 is temporarily stopped.

When the start/stop button 80 is depressed again, the stop mode is changed over to the recording mode, so that the recording of the motion picture is started again, and at the same time a new still picture frame cycle Tc begins.

As was described above, a frame (or frame picture) of a motion picture is extracted with a predetermined period and PCM-recorded as a still picture in the PCM tracks (regions) in the 8-mm video format. When an instruction signal to stop the recording operation is produced by operating the start/stop button 80, the current still picture frame cycle Tc is not suspended, but the operation mode is changed over to the stop mode after the still picture frame cycle Tc is completed.

Accordingly, for every frame, the PCM still picture record pattern is continuously formed on the PCM tracks TR$_P$ of the magnetic tape 36.

Figure 16:
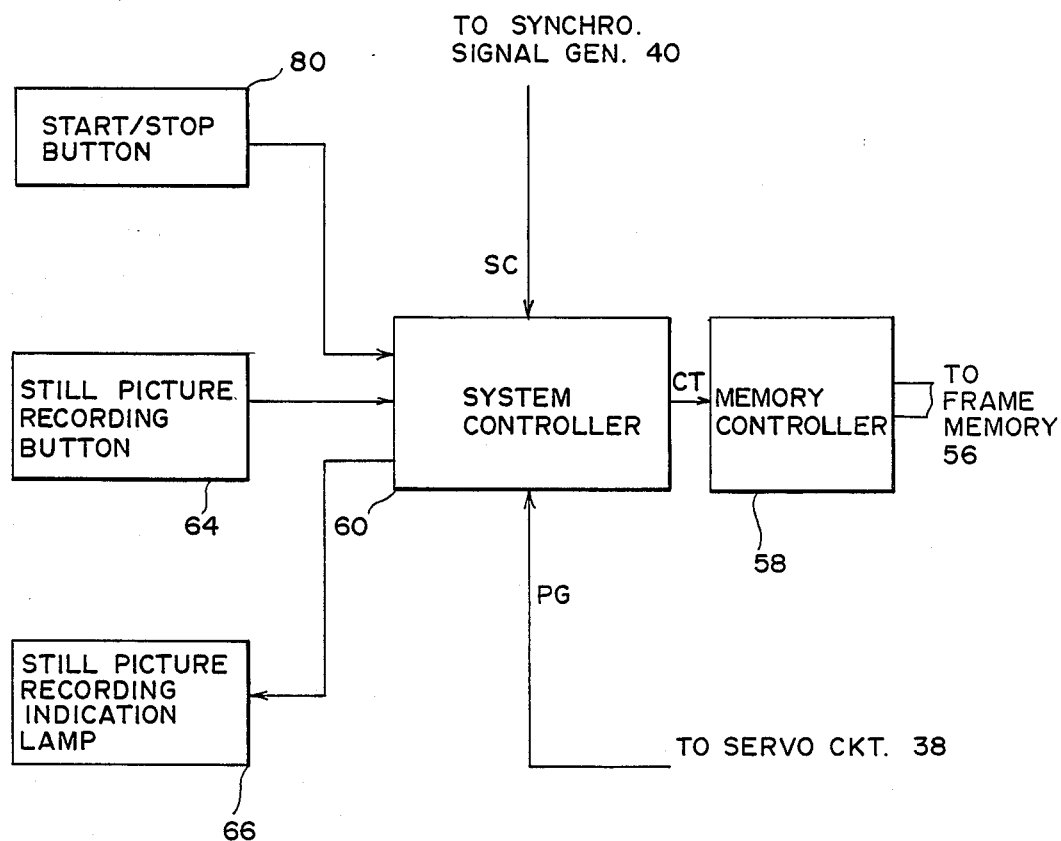
FIG. 16 is a block diagram showing a sixth embodiment of the present invention.

FIG. 16 shows the arrangement of essential component of an 8-mm video cassette recorder which is a fifth embodiment of the invention. Components not shown in FIG. 16 are shown in FIG. 13.

In the fifth embodiment, upon depression of a still picture recording button 62, a frame of a motion picture is PCM-recorded as a still picture. A still picture recording lamp 64 is provided in the view finder, and is turned on when the PCM still picture recording operation is carried out, thus indicating that the PCM still picture recording operation is being performed.

The PCM still picture recording operation of the fifth embodiment will be described with reference to FIG. 17.

Figure 17:
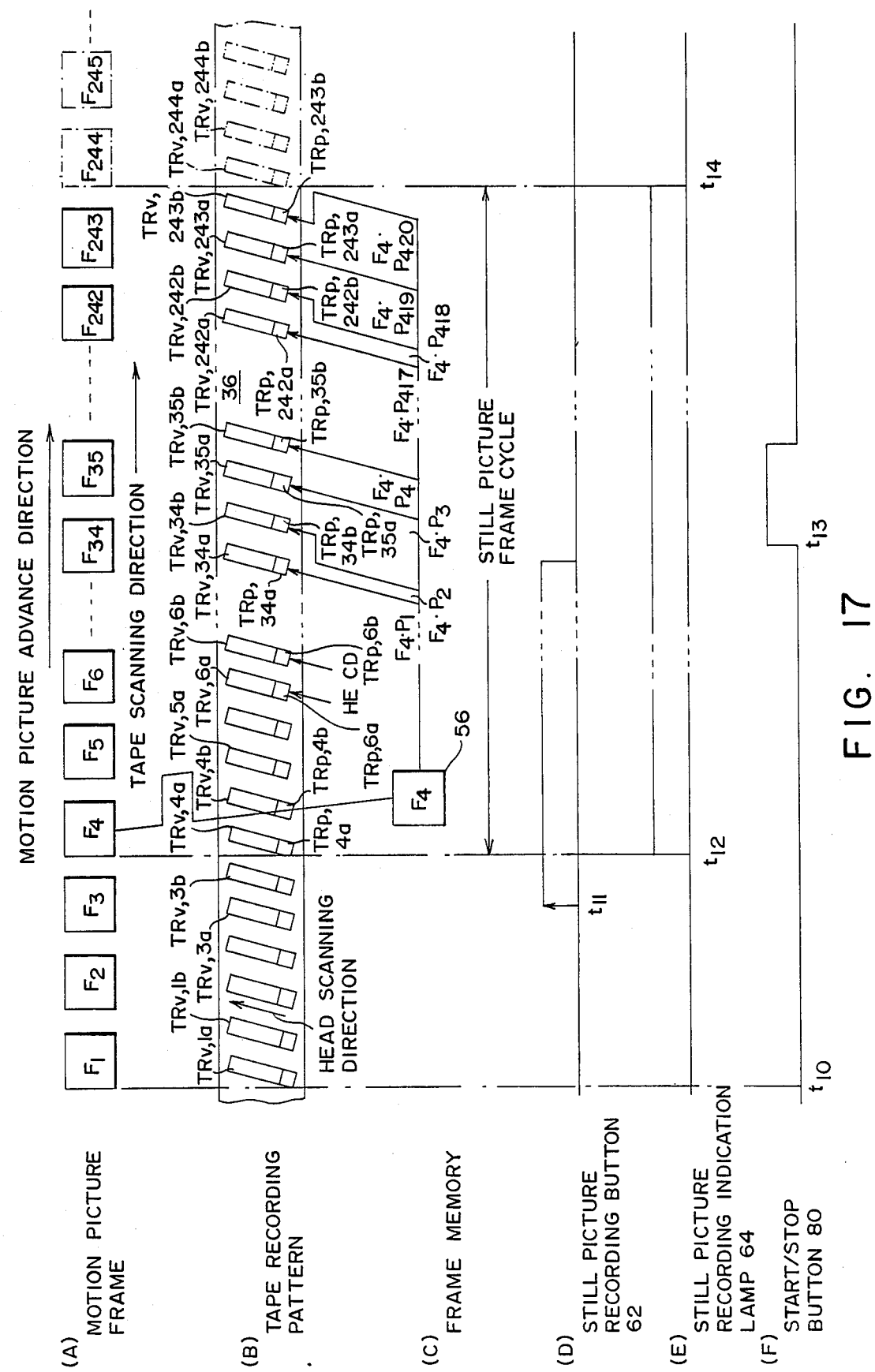
FIG. 17 (A)-(F) and 18 (A)-(F) are explanatory diagrams for a description of the sixth embodiment of FIG. 16.

In FIG. 17, the start/stop button 80 was depressed before the time instant t$_{10}$, and the recording mode is provided at the time instant t$_{10}$. Therefore, in this case, the frame picture F1 is recorded in the form of an analog video signal Video on the video tracks TR$_{V,1a}$ and TR$_{V,1b}$ of the magnetic tape 36.

The still picture recording button is depressed at the time instant t$_{11}$, when the frame picture F3 is being recorded. In response to the operation of the button 62, the system controller 60 applies an instruction signal to the memory controller 58 at the time instant t$_{12}$, when recording of the next frame picture F4 is started, so that the writing operation of the frame memory 56 is effected. The time instant t$_{12}$, when the recording operation is started, is based on the head phase pulse PG from the servo circuit 38. From the time instant t$_{12}$ on, the digital signals YD, (R−Y)D and (B−Y)D representing the frame picture F4 are stored in the frame memory 56. At the same time, the system controller 60 turns on the still picture recording lamp 64. The digital signals YD, (B−Y)D and (R−Y)D thus stored are stored by 1H, in the form of PCM signals F4-P1 through F4-P420, in 420 PCM tracks TR$_{P,34a}$ through TR$_{P243b}$, in a predetermined period of time. The recording time is seven seconds similarly as in the first embodiment. No still picture data are recorded in thirty PCM tracks TR$_{P,3a}$ through TR$_{P,33b}$ (corresponding to one second) located before the PCM track TR$_{P,34a}$, but a header HE and a control data CD are recorded therein.

In the case of FIG. 17, the start/stop button 80 is depressed at the time instant in the still picture frame cycle Tc'; however, the frame cycle Tc' is not suspended. When the frame cycle Tc' is ended at the time instant t$_{14}$, the operation mode is switched over to the stop mode.

In the case where the start/stop button 80 is not depressed during the still picture frame cycle Tc', after the time instant $t_{14}$ the motion picture recording operation is continued as indicated by the phantom lines, but the PCM still picture recording operation is not carried out. That is, the PCM still picture recording operation is carried out when the still picture recording button 62 is depressed again.

Similar to the first embodiment, when the start/stop button 80 is depressed during the PCM still picture recording operation, the current still picture frame cycle continues to completion. The effects of the second embodiment on the picture quality of the reproduced still picture, the arrangement of the device and the manufacturing cost are the same as those of the first embodiment.

A sixth embodiment of the invention is equal in arrangement to the fifth embodiment; however, it should be noted that the sixth embodiment is so designed that, when the still picture recording button 62 is not depressed, a frame of a motion picture is automatically extracted with a predetermined period and PCM-recorded as a still picture, and when the button 62 is depressed, the current still picture frame cycle Tc is suspended, and instead a new still picture frame cycle Tc' is started by interruption.

Figure 18:
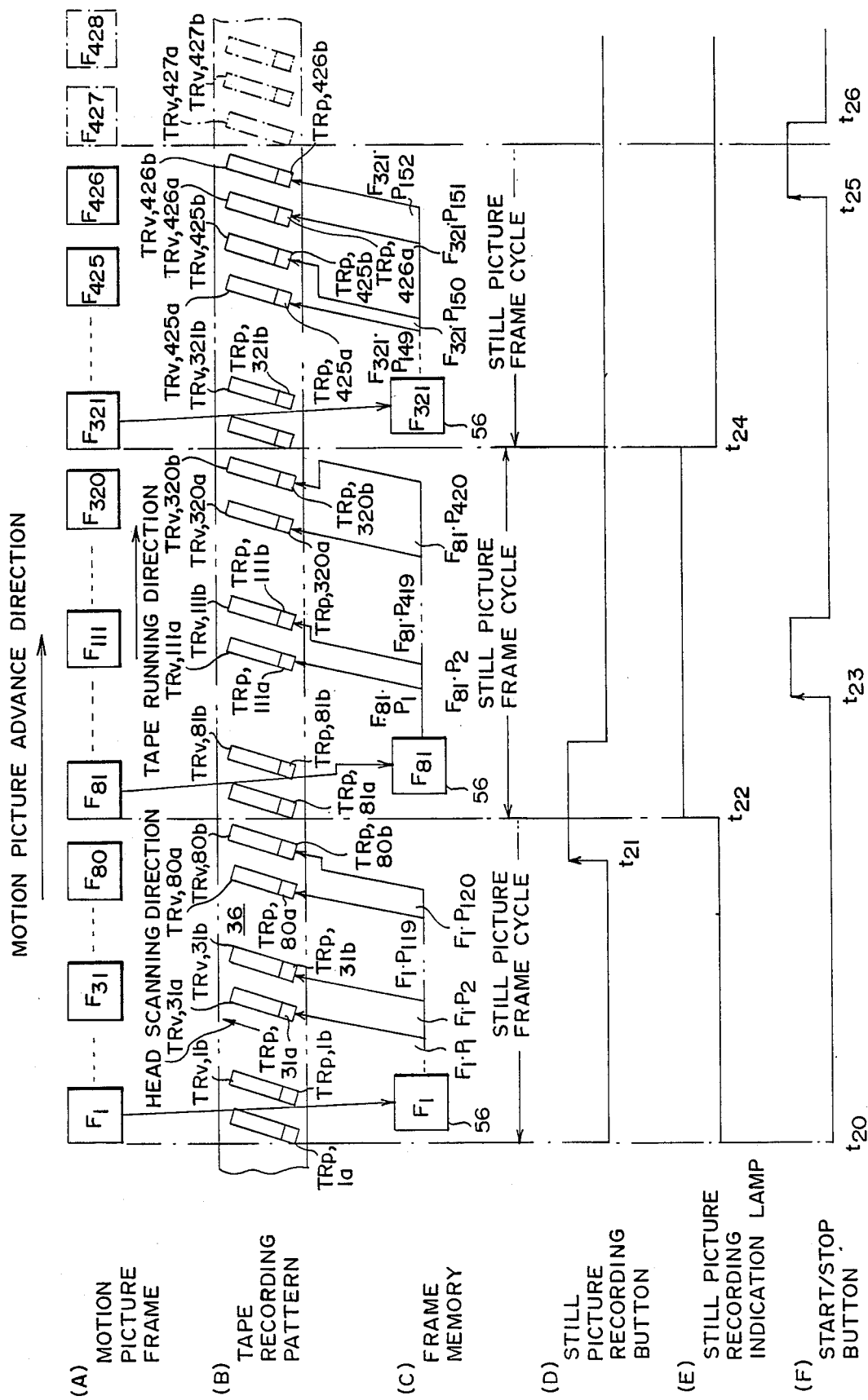

In FIG. 18, the start/stop switch button 80 is depressed before the time instant $t_{20}$, which occurs in a still picture frame cycle Tc having a predetermined period.

The still picture recording button 62 is depressed at the time instant $t_{21}$, when the frame picture F80 is recorded as a motion picture and the frame picture F1 is PCM-recorded as a still picture.

In response to the depression of the still picture recording button 62, the system controller 60 issues an instruction signal to the memory controller 58 so that at the time instant $t_{22}$ the frame memory 56 suspends the reading operation and starts the writing operation. Therefore, from the time instant $t_{22}$ on, the digital signals YD, (R−Y)D and (B−Y)D representing the frame picture F81 are stored in the frame memory 56. At the same time, the system controller 60 turns on the interruption still picture recording lamp 64.

The digital signals YD, (R−Y)D and (B−Y)D thus stored are recorded by 1H, as PCM signals F81·P1 through F81·P420, in a plurality of continual PCM tracks $TR_{P,81a}$ through $TR_{P,320b}$. A header HE recorded prior to the still picture includes the data that the preceding still picture frame cycle Tc has been suspended.

When the PCM still picture recording operation of the frame picture F81 is accomplished at the time instant $t_{24}$, the system controller 60 allows another still picture frame cycle Tc of the steady mode to start, so that the frame picture F321 occurring immediately after the time instant $t_{24}$ is stored in the frame memory 56. On the other hand, at the time instant $t_{24}$ the system controller 60 turns off the interruption still picture recording lamp 64, to indicate the fact that the next interruption still picture recording operation can be made; i.e., the interruption still picture recording button 62 may be depressed.

In FIG. 18, the start/stop switch button 80 is depressed at the time instant $t_{23}$; however, the depression of the button 80 is made ineffective because the interruption still picture frame cycle Tc' is being continued. When the start/stop switch button 80 is depressed at the time instant $t_{25}$ again, the depression of the button 80 is effective because it is depressed during the still picture frame cycle Tc of the predetermined period. As a result, the operation mode is immediately switched over to the stop mode. That is, at the time instant $t_{26}$ when the motion picture recording operation of the frame picture F426 is ended after the depression of the button 80 the running of the magnetic tape 36 is temporarily stopped. In this case, the still picture frame cycle Tc of the predetermined period is suspended.

As was described above, in the sixth embodiment, the interruption still picture frame cycle Tc' is not suspended by the operation of the start/stop switch button 80, but the still picture frame cycle Tc of the predetermined period is suspended by the operation of the still picture recording button 64 or the start/stop switch button.

The sixth embodiment may be so modified that, when the start/stop switch button 80 is depressed during the interruption still picture frame cycle Tc', the depression of the button 80 is not made ineffective; that is, the frame cycle Tc' is extended until the time instant $t_{24}$, and at the time instant $t_{24}$ the operation mode is changed over to the stop mode.

While three preferred (fourth to sixth) embodiments of the invention have been described in detail, it is particularly understood that the invention is not limited thereto or thereby; that is, it will be obvious to those skilled in the art that various changes and modifications may be made therein without departing from the invention.

In the above-described embodiments, when the recording operation stopping instruction is issued during a PCM still picture recording operation, suspension of the motion picture recording operation is postponed until the PCM still picture recording operation is accomplished so that the PCM still picture recording operation may not be interrupted. However, the embodiments may be modified as follows: Immediately when the recording operation stopping instruction is given, the motion picture recording operation is suspended, but the PCM still recording operation is continued to completion. After the PCM still picture recording operation is accomplished, the magnetic tape is rewound to the point where the motion picture recording operation has been suspended, so that, upon the next start instruction, the motion picture recording operation is started from that point. In this case, the successive motion pictures are smoothly connected. However, in this embodiment, the PCM still picture recording operation should not be performed between the point on the magnetic tape where the motion picture recording operation has been started again and the point where the preceding PCM still picture recording operation has been ended.

In the above-described embodiments, the PCM still picture recording operation is continued no matter when the stop instruction is given during the PCM still picture recording operation. However, the embodiments may be so designed that, when the stop instruction is issued, it is determined according to the progress of PCM still picture recording operation whether or not the PCM still picture recording operation should be continued. For instance, a method may be employed in which, when the stop instruction is given immediately after the start of a still picture frame cycle, the still picture frame cycle is suspended immediately and the operation mode is switched over to the stop mode.

In the above-described embodiments, the sampling frequencies, the quantizing characteristics, and the recording time are given by way of example, and they may be set to other values.

As was described above, in the magnetic recording device of the invention, while a motion picture is being recorded, a unitary picture component, such as a frame or field, of the motion picture is extracted and PCM-recorded as a still picture. Therefore, for instance in the case of a camera recorder, not only can a motion picture be recorded, but also a still picture can be recorded when necessary. When the unitary picture component thus recorded is reproduced on a television screen or formed as a hard copy, the resultant still picture is appreciably high in picture quality.

Furthermore, in the magnetic recording device of the invention, even when the instruction is given to suspend the motion picture recording operation during the PCM still picture recording operation, the PCM still picture recording operation of the aimed unitary picture component of the motion picture is continued completion. Therefore, the frame or field can be completely recorded as a still picture.

Now, a PCM audio recording system of a seventh embodiment which can selectively perform an operation of recording a still picture with high picture quality and an operation of recording an audio signal with high sound quality will be described with reference to FIGS. 19 and 20.

Figure 19:
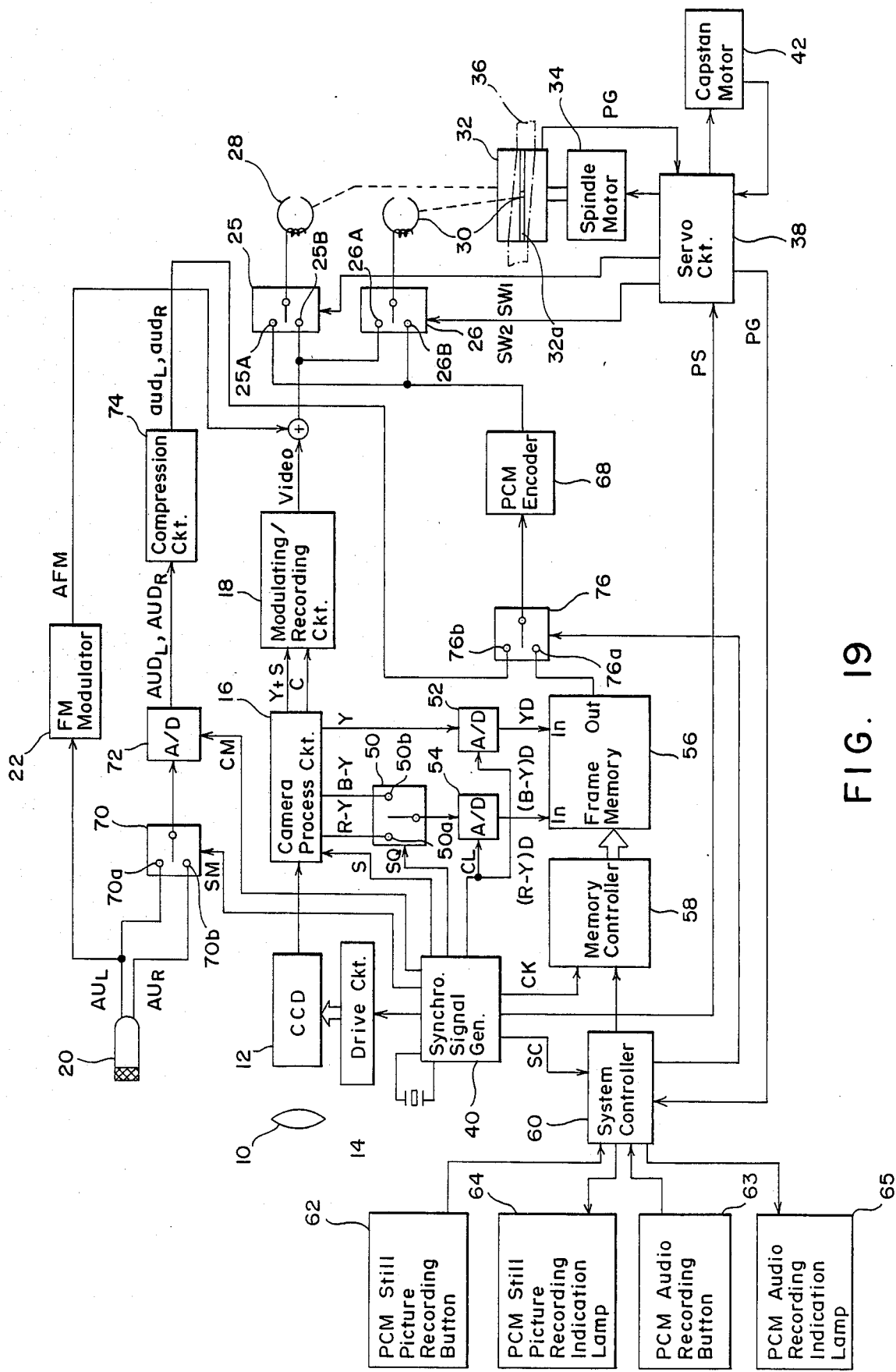
FIG. 19 is a block diagram showing a seventh embodiment of the present invention.
Figure 20:
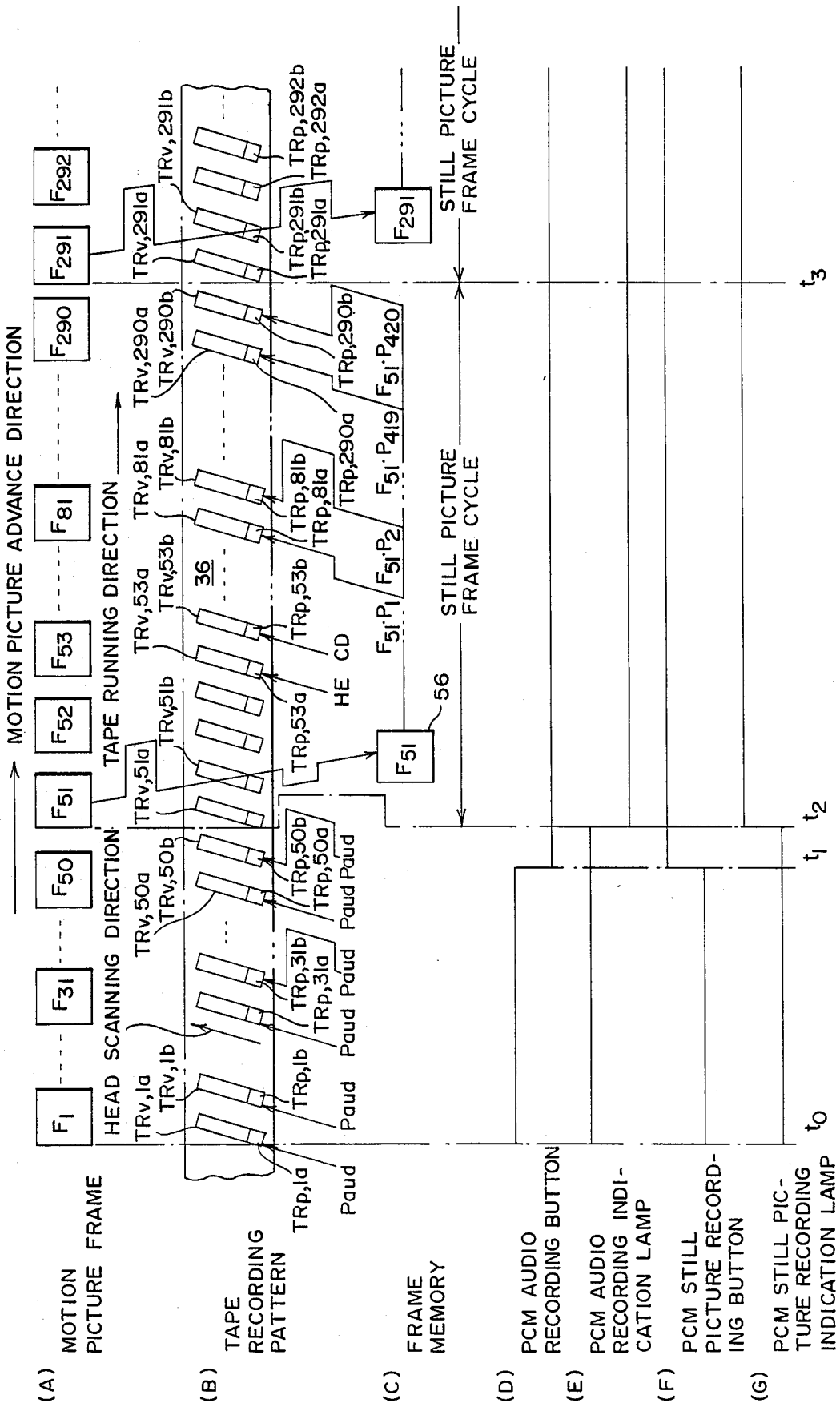
FIG. 20, (A)-(G), is an explanatory diagram for description of the seventh embodiment of FIG. 19.

In FIGS. 19 and 20, parts which have been shown in FIGS. 3 and 6 bear the same reference numerals and have the same functions. Two-channel audio signals $AU_L$ and $AU_R$ output by a microphone 20 are applied to two input terminals 70a and 70b of a switch 70, respectively. In response to a change-over signal SM from a synchronizing signal generating circuit 40, the switch 70 is operated; that is, the armature of the switch 70 is tripped over to the input terminals 70a and 70b alternately at a switching speed corresponding to a predetermined sampling frequency fH (about 31.5 KHz). The output of the switch 70 is applied to an A/D (analog-to-digital) converter 72. In response to a clock signal CM from the synchronizing signal generating circuit 40, the A/D converter 72 alternately converts the analog audio signals $AU_L$ and $AU_R$ into digital audio signals $AUD_L$ and $AUD_R$ of 10-bits.

Each Of the digital audio signals $AUD_L$ and $AUD_R$ is supplied to a compression circuit 74, where it is subjected to time axis compression at a rate of about 1/6 and from 10-bit to 8-bit conversion. The time axis compression is to record an audio signal which is continuous in time in the PCM tracks $TR_P$ which are small in area and which occur intermittently. The digital audio signals $AUD_L$ and $AUD_R$ provided during the period of time corresponding to the head scanning interval of 180° are converted into digital audio signals $aud_L$ and $aud_R$ for the period of time corresponding to the PCM track interval of 36°. The 10-bit to 8-bit conversion is carried out because data can be recorded only by an 8-bit quantizing bit number in the PCM track $TR_P$ which is small in area; that is, it is intended to obtain a dynamic range corresponding to 10-bits by nonlinear quantization of 10-bits to 8-bits. The digital audio signals $aud_L$ and $aud_R$ output by the compression circuit 74 are supplied through a change-over switch 76 to a PCM encoder 68.

The PCM encoder 68 is commercially available for a 8-mm video cassette recorder. In the PCM encoder 68, error correction and modulation are performed according to the 8-mm video format; that is, cross interleave codes of 8-words and 2-parities are used as error correcting codes, and addresses, synchronizing signals and parities are added to the data, which includes not only the video signals but also IB words for index. A biphase modulation, which is a kind of FM modulation, is employed so that the recording system following the PCM encoder 68 is commonly used for analog signals and PCM signals.

The digital audio signals $aud_L$ and $aud_R$ applied to the PCM encoder 68 are converted into a PCM signal with an error correcting code, which is applied through the switches 25 and 26 to the magnetic heads 28 and 30 so as to be recorded on the PCM tracks $TR_P$ of the magnetic tape 36.

The system controller 60 receives a system clock signal SC from the synchronizing signal generating circuit 40 and a head phase pulse PG from the servo circuit 38, to control various circuit elements in the system. Furthermore, in response to the operation of a PCM still picture recording button 62 installed on the outside of the camera housing, the system controller 60 issues instructions to a memory controller 58 to permit the writing and reading operations of the frame memory, and causes the armature of the switch 76 to trip over to the terminal 76a. A PCM still picture recording lamp 64 is provided in the finder, and it is turned on while the PCM still picture recording operation is being carried out. That is, the lamp 64 is used to indicate that the PCM still picture recording operation is on. In response to the operation of a PCM audio recording button 63 provided on the outside of the camera housing, the system controller 60 operates to trip the armature of the changeover switch 76 to the terminal 76b to provide the PCM audio recording mode, and to turn on a PCM audio recording lamp 65 in the finder. In this embodiment, the PCM still picture recording button 62 and the PCM audio recording button 63 are so designed that when one of the buttons is depressed (on), the other is reset (off), and vice versa.

In FIG. 19, a circuit for recording the tracking pilot signal TPS is not shown.

An operation of the seventh embodiment of FIG. 19 will be described. At the time instant $t_o$, the PCM audio recording button 63 is depressed to select the PCM audio recording mode. In this mode, in FIG. 19 the armature of the switch 76 is tripped over to the terminal 76b, so that the digital audio signals $aud_L$ and $aud_R$ are supplied from the compression circuit to the PCM encoder 68 during the scanning period of each PCM track $TR_P$. The digital audio signals $aud_L$ and $aud_R$ are each recorded as a PCM signal $P_{aud}$ in the PCM tracks $TR_{P,1a}$, $TR_{P,1b}$ and so forth. In this operation, the PCM audio recording lamp 65 is kept turned on.

In this embodiment, the PCM still picture recording operation is started upon operation of the PCM still picture recording button 62. In FIG. 20, at the time instant $t_1$, the PCM still picture recording button 62 is depressed. In this case, the motion picture recording operation of the frame picture F50 is being carried out. In response to the button operation, the system controller 60 operates to trip the armature of the switch 76 over to the terminal 76a at the time instant $t_2$ of starting the recording of the next frame picture F51, and to issue an instruction to the memory controller 58 to permit the writing operation of the frame memory 56. As the PCM still picture recording button 62 is depressed as described above, the PCM audio recording button 63 is reset. Thus, from the time instant $t_2$ on, the digital signals YD, (R−Y)D and (B−Y)D representing the frame picture F51 and inputted into the frame memory 56. At the same time, the system controller 60 operates to turn on the PCM still picture recording lamp 64 and to turn off the PCM audio recording lamp 65.

In the above-described embodiment, only one of the PCM still picture recording mode and the PCM audio recording mode is selected. However, the embodiment may be so modified that the two modes can be selected simultaneously. In the modification, the armature of the switch 70 is not alternately tripped over to the input terminals 70a and 70b, but instead the armature is alternately tripped over to one of the input terminals (for instance the input terminal 70a) and the neutral position (where the armature is connected to none of the terminals 70a and 70b) so as to sample and quantize only the left channel audio signal $AU_L$, and during the PCM track ($TR_P$) scanning period the armature of the switch 76 is alternately tripped over to the input terminals 76a and 76b so that the digital audio signal $aud_L$ and the digital video signals YD, (R−Y)D and (B−Y)D are recorded together in the PCM tracks $TR_P$. In this case, the length of time of the still picture frame is doubled, and the PCM audio signal is monaural.

In the above-described embodiment, in the PCM still picture recording mode, a frame of the motion picture is automatically PCM recorded, as a still picture, with the predetermined period. However, it may be so modified that when necessary, a frame of a motion picture is PCM-recorded as a still picture by operating a button.

In the invention, the PCM still picture recording operation can be performed after the motion picture recording operation according to the after-recording system. In this case, a still picture of a scene different from that of the motion picture can be recorded.

The technical concept of the invention is applicable to a so-called "fixed video tape recorders" so that television pictures can be PCM-recorded as still pictures.

As was described above, in the magnetic recording device of the invention, the PCM still picture recording operation and the PCM audio recording operation are selectively carried out, and in the PCM still picture recording mode, during a motion picture recording operation or according to the after-recording system separating from the motion picture recording operation a unitary picture component such as one frame or field of a motion picture can be PCM-recorded as a still picture. Therefore, in the case of a camera recorder, not only a motion picture but also a still picture can be recorded at any time. And when the unitary picture component thus recorded is reproduced on a television screen or as a hard copy, the resultant still picture is appreciably high in picture quality.

As mentioned above, the PCM still picture recording operation is carried out according to the 8-mm video format, the PCM tracks $TR_P$ and the video tracks $TR_V$ correspond to the PCM tracks and video tracks of an 8-mm video cassette recorder, respectively, and the head scanning intervals are 36° and 180°. For formation of the PCM signals, a PCM encoder for 8-mm video cassette recorder, which is commercially available, is used, and error correction and modulation are performed similarly as in the PCM audio recording operation of an 8-mm video cassette recorder, which is commercially available, is used, and error correction and modulation are performed similarly as in the PCM audio recording operation of an 8 mm video cassette recorder. That is, cross interleave codes of 8-words and 2-parities are used as error correction codes, and address, synchronizing signals and parities are added to addresses, which include not only video signals but also ID words for index.

Figure 21:
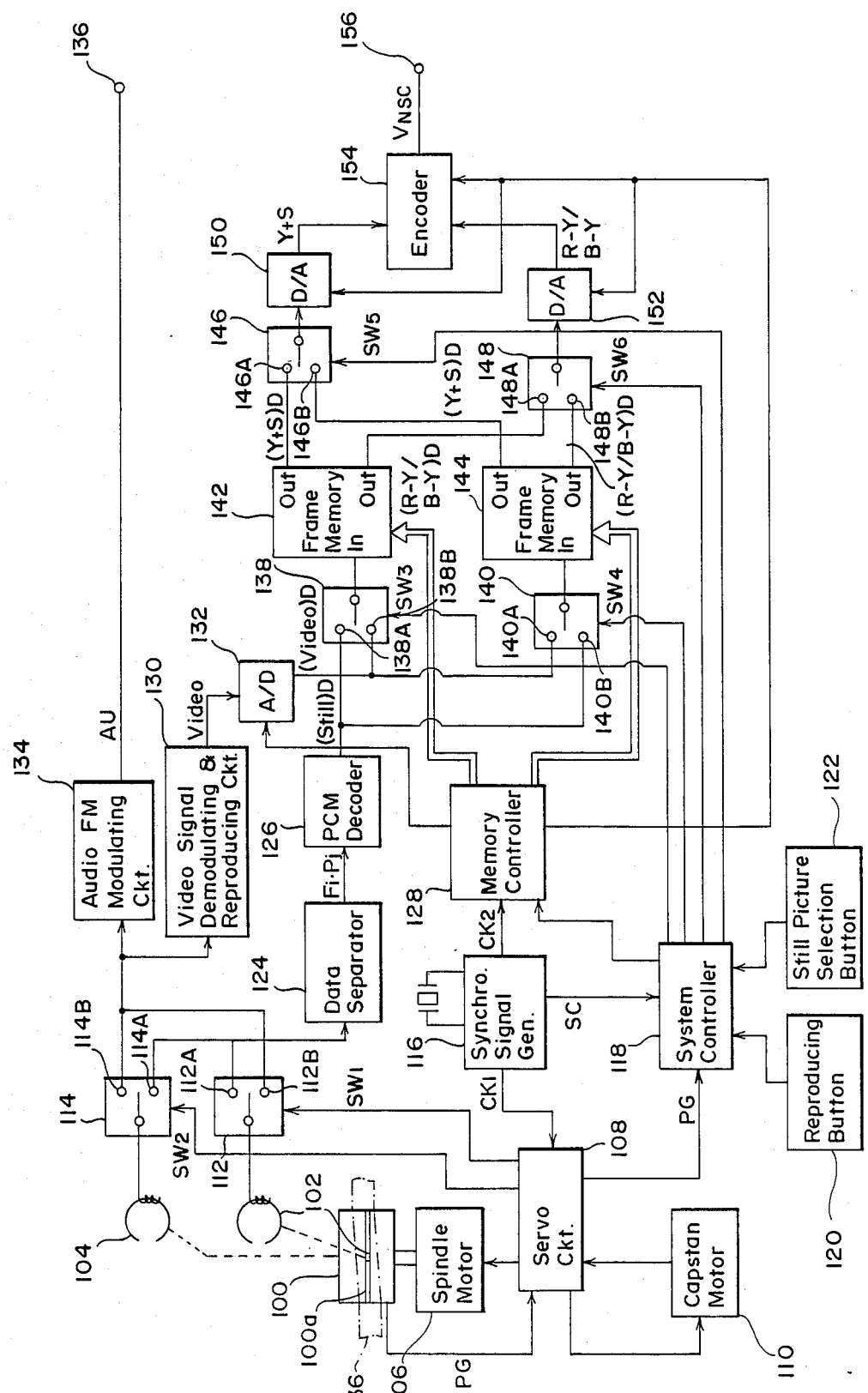
FIG. 21 is a block diagram showing an embodiment of a magnetic reproducing device of the present invention.

FIG. 21 shows the arrangement of a magnetic reproducing device which is one embodiment of this invention.

In FIG. 21, a pair of magnetic heads 102 and 104 are fitted in a slit 100a formed substantially in the middle of a cylinder 100 in such a manner as to be opposite to each other. The cylinder 100 is rotated by a spindle motor 106 at a speed of 30 revolutions per second which is equal to the frame frequency. A magnetic tape 36 obliquely wound on the cylinder 100 is run at a predetermined speed by a tape running mechanism, so that the magnetic tape 36 is obliquely scanned by the magnetic heads 102 and 104 alternately. A tape recording pattern as shown in the part (B) of FIG. 4 is formed on the magnetic tape 36.

The cylinder 100 has a magnet piece and a stationary head (not shown) which produces a pulse PG representing the rotational phase of the magnetic heads 102 and 104. The pulse PG is supplied to a servo circuit 108. In the servo circuit 108, the phase of the pulse PG is compared with that of a reference pulse CK1 provided by a synchronizing signal generating circuit 116. That is, the servo circuit 108 controls the spindle motor 106 so that the rotation of the heads is synchronous with the reference pulse CK1, and also controls a capstan motor 110 so that the speed of running the magnetic tape 36 is maintained constant. The servo circuit 108 further operates to supply switch change-over signals SW1 and SW2 to switches 112 and 114, respectively, so that the switches are closed alternately every head scanning period. That is, when the tape 36 is scanned by the magnetic head 102, the switch 112 is closed whereas the switch 114 is opened. In a PCM reproduction period (or PCM track scanning period) the armature of the switch 112 is tripped over to its terminal 112A so that the output signal (read out of the PCM track) of the magnetic head 102 is supplied to a data separator 124. In the following motion picture recording period (or video track scanning period), the armature of the switch 112 is tripped over to its terminal 112B so that the output signal (read out of the video track) of the magnetic head 102 is applied to a video signal demodulating/reproducing circuit 130 and an audio FM demodulating circuit 134. Similarly, when the tape 36 is scanned by the magnetic head 104, the armature of the switch 114 is tripped over to its terminals 114A and 114B sequentially, whereas the other switch 112 is maintained opened.

In the audio FM demodulating circuit 134, an audio FM signal is demodulated from an input signal. The output audio signal AU of the audio FM demodulating circuit 134 is supplied to an audio output terminal 136.

In the video signal demodulating/reproducing circuit 130, an FM luminance signal and a low frequency conversion color signal are separated from an input signal. The FM luminance signal is subjected to signal processing such as demodulation and deemphasis to reproduce a luminance signal, and the low frequency conversion color signal is subjected to signal processing such as reverse conversion and color processing to reproduce a color signal. The luminance signal and the color signal are mixed to provide an analog video signal Video. The analog video signal Video is supplied to an analog-todigital (A/D) converter 132, the output digital video signal (Video)D is applied to a terminal 138B of a switch 138 and to a terminal 140A of a switch 140.

The data separator 124 is a data identification circuit which detects the zero cross point of an input signal to shape the PCM signal. The output signal of the data separator 124 is applied to a PCM decoder 126. The PCM decoder 126 decodes the reproduced PCM signal and performs error detection and error correction with the aid of the cross interleave code thereby to substantially recover dropouts. A still picture reproducing digital video signal (Still)D provided at the output terminal of the PCM decoder 126 is applied to a terminal 138A of the switch 138 and to a terminal 140B of the switch 140.

A system controller 118 receives a system clock SC from the synchronizing signal generating circuit 108, and issues instruction signals to a memory controller 128 so that the inputting (writing) or outputting (reading) operation of frame memories 142 and 144 is effected. For this purpose the system controller 118 controls the operations of the switches 138 and 140 and of switches 146 and 148, and controls other relevant circuits in the system.

A reproduction button 120 starts the reproducing operation of the magnetic reproducing device, and a still picture selection button 122 selects a still picture reproduction.

The frame memories 142 and 144 receive the still picture reproducing digital video signal (Still)D which is output intermittently by 1H by the PCM encoder 126 or the motion picture reproducing digital video signal (Video)D which is continuously output by one field by the A/D converter 132. In this case, the system controller 118 controls the switches 138 and 140 to select one of the digital video signals (Still)D and (Video)D which is to be applied to the frame memories 142 and 144. For instance where the still picture reproducing digital video signal is applied to the frame memory 142, the one-frame inputting (writing) time is seven (7) seconds corresponding to the one-frame recording time. The still picture reproducing digital video signal of one frame thus stored in the frame memory 142 is read out at a predetermined reading speed corresponding to one frame period (1/30 second).

The memory controller 128 controls the inputting (writing) and outputting (reading) operations of the frame memories 142 and 144 individually according to instruction signals from the system controller 118. For instance, the memory controller 128 can control the frame memories 142 and 144 in such a manner that while the inputting operation of the frame memory 142 is being effected, the outputting operation of the frame memory 144 is carried out. In this case, the armature of the switch 138 is tripped over to the terminal 138A or 138B according to the input signal, and the armatures of the switches 146 and 148 are tripped over to the terminals 146A and 148A, respectively, so that they are connected to the output terminals of frame memory 142. It is possible to effect the writing operations of the frame memories 142 and 144. In this case, the switches 138 and 140 are so operated as to receive different input signals; for instance, when the armature of the switch 138 is tripped over to the terminal 138A, the armature of the switch 140 is tripped over to the terminals 140B.

Each of the frame memories 142 and 144 has an output terminal for a digital luminance signal plus synchronizing signal (Y+S)D and another output terminal for a digital color difference signal (R−Y/B−Y)D. The output terminals of the frame memory 142 are connected to the terminal 146A of the switch 146 and the terminal 148A of the switch 148, whereas the output terminals of the frame memory 144 are connected to the terminal 146B of the switch 146 and the terminal 148B of the switch 148, respectively. The switches 146 and 148 are controlled by the change-over control signals SW5 and SW6 from the system controller 118, respectively, so that, for the reading operation of the frame memory 142 the armatures of the switches 146 and 148 are tripped over to the terminals 146A and 148A, respectively, and for the reading operation of the frame memory 144 the armatures of the switches 146 and 148 are tripped over to the terminal 146B and 148B, respectively.

The digital luminance signal plus synchronizing signal (Y+S)D passing through the switch 146 is applied to a digital-to-analog (D/A) converter 150, where it is converted into an analog luminance signal plus synchronizing signal (Y+S). Similarly, the digital color difference signal (R−Y/B−Y)D passing through the switch 148 is supplied to a digital-to-analog (D/A) converter 152, where it is converted into an analog color difference signal (R−Y/B−Y). The analog luminance signal plus synchronizing signal (Y+S) output by the D/A converter 150 and the analog color difference signal (R−Y/B−Y) output by the D/A converter 152 are supplied to an NTSC encoder 154. In the NTSC encoder 154, a color video signal $V_{NTSC}$ is formed according to these input signals and supplied to a video output terminal 156.

The operation of the magnetic reproducing device according to the invention will be described with reference to FIG. 22.

Figure 22:
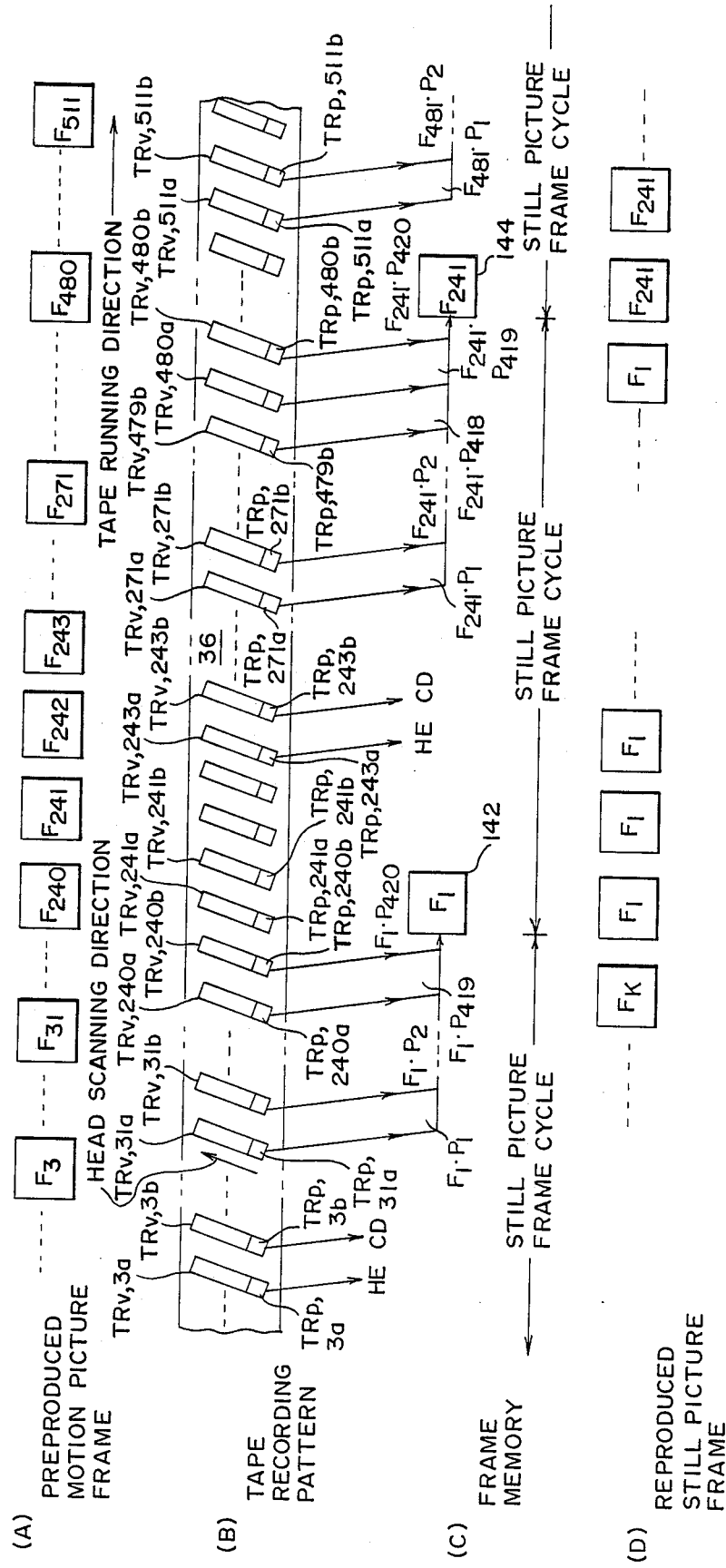
FIG. 22, (A)-(D) is an explanatory diagram for a description of the embodiment of FIG. 21.

The part (B) of FIG. 22 shows a tape recording pattern on the magnetic tape 36, which is to be reproduced. Each time the magnetic tape 36 is scanned by the magnetic heads 102 and 104, the analog video signal F1 P1, F1 P2 and so on of 1H, which have been PCM-recorded as a still picture, are read, for instance, out of PCM tracks $TR_{P,31a}$, $TR_{P,31b}$ and so on.

These PCM signals F1 P1, F1 P2 and so forth thus read are supplied successively to the PCM decoder 126, where they are decoded into digital video signals (Still)D, which are supplied through the switch 138, for instance, into the frame memory 142. When the PCM signal F1 P420 of 1H is read from the PCM track $TR_{P,240b}$ and the corresponding digital video signal (Still)D is applied to the frame memory 142, the storage of one frame picture F1 is accomplished, and the outputting (reading) operation is started. That is, the contents of the frame memory 142 are read out so as to produce an NTSC color video signal $V_{NTSC}$ at the video output terminal 156 to reproduce the frame picture F1 as a still picture.

When the outputting (reading) operation of the frame memory 142 is started, another still frame cycle Tc for the frame picture F241 occurs. In the frame cycle Tc, PCM signals F241 P1, F241 P2 and so forth of 1H read from PCM tracks $TR_{P,271a}$, $TR_{P,271b}$ and so forth are successively decoded into digital video signals (Still)D by the PCM decoder 126, which are stored in the frame memory 144 through the switch 140. When the PCM signal F241 P420 is read out of the PCM track $TR_{P,480b}$ and the corresponding digital video signal (Still)D is stored in the frame memory 144, the storage of the frame picture F241 is accomplished, and the content of the frames memory 144 are repeatedly read, so that an NTSC color video signal $V_{NTSC}$ is provided at the video output terminal 156 to reproduce the frame picture F241 as a still picture. In this operation, the frame memory 142 has accomplished its reading operation, thus being ready for storage of the next digital video signal.

As was described above, the writing and reading operation of the frame memories 142 and 144 are carried out alternately every still picture frame cycle $T_c$, so that the frame pictures F2, F241 and so further PCM-recorded recorded are reproduced as still pictures each of eight seconds. In the case where the output signal is supplied to the printer, the 8-second signal reproduction is unnecessary; that is, the output signal need be supplied to the printer only once.

The PCM still picture is thus reproduced by the printer only once.

The PCM still picture thus reproduced is substantially free from dropout. Therefore, the still picture displayed on a television set or formed as a hard copy is appreciably high in picture quality although being lower than a silver salt picture.

The part (A) of FIG. 22 shows that reproduction of motion picture frames are obtained successively according to motion picture analog video signals Video read out from continual video tracks $TR_{P,i}a$ and $TR_{P,ib}$.

The parts (A) and (D) of FIG. 22 show frame pictures for motion picture and frame pictures for still picture by way of example. That is, in practice, the picture displayed on the television set is selected by the operator. In the embodiment, the two frame memories 142 and 144 are employed, and it follows that, in the embodiment, both a motion picture and a still picture can be reproduced on the television set at the same time; that is, the magnetic reproducing device of the invention has a so-called "multi-picture reproducing function" or "picture-in-picture" reproducing function. In reproduction of a motion picture, it is unnecessary to store the motion picture digital video signal in memory, and therefore one of the two frame memories 142 and 144 can be eliminated.

In the embodiment, the 8-mm video format is utilized, and therefore a PCM decoder for PCM audio signal in an 8-mm video cassette recorder can be used as the PCM decoder 126. Furthermore, in the embodiment, the motion picture reproduction and the still picture reproduction are performed in a parallel mode by using the same magnetic tape 36 and magnetic heads 102 and 104, and no special mechanisms are employed. Therefore, the magnetic reproducing device according to the invention is lightweight and low in manufacturing cost and can be used conveniently.

The above described magnetic reproducing device of the present invention operates in counterpart to the magnetic recording devices, the embodiments of which are shown in FIGS. 3, 6, 8, 11, 13, 16 and 21. In this case, a display lamp should be provided to indicate that the PCM still picture reproducing operation is being effected.

In the magnetic recording device of FIG. 19, the PCM still picture recording operation and the PCM audio recording operation can be selectively carried out. For this magnetic recording device, the magnetic reproducing device of the invention should be so modified that one PCM decoder is used in such a manner that the output of the PCM decoder is used selectively for audio signals and video signals. This modification will not make the device intricate in arrangement.

The aforementioned magnetic recording device can be joined into a magnetic recording and reproducing device. In this case, the cylinder, the magnetic heads, the servo circuit and the system controller can be used both for recording and for reproducing.

As is apparent from the above description, with the magnetic recording and reproducing device of the invention, a magnetic tape having a predetermined recording pattern is helically scanned with the magnetic heads in the conventional manner, so that while the motion picture is being reproduced, the PCM-recorded still picture can be reproduced with high picture quality.

What is claimed is:

1. A magnetic recording device of a helical scanning system provided with rotary magnetic heads, for recording a PCM video signal representative of successive frames of a motion picture, comprising:
    PCM still picture recording means for recording a still picture in a time division manner in a scanning period of said magnetic heads, said PCM still picture recording means including,
    means for converting a selected frame of said motion picture into a digital video signal,
    means for receiving said digital video signal for subjecting said digital video signal to a time axis expansion, and
    means for converting said expanded digital video signal into said PCM signal and for recording said PCM signal on said magnetic tape over a plurality of continual head scanning periods.

2. A magnetic recording device as claimed in claim 1, wherein said PCM signal is recorded in a plurality of PCM regions of a plurality of motion picture tracks where said analog video signal of said motion picture is recorded.

3. A magnetic recording device as claimed in claim 2, wherein one horizontal scan of said digital video signal for said still picture frame is recorded in each said PCM region for each of said plurality of continual head scanning periods.

4. A magnetic recording device as claimed in claim 1, further comprising means for recording an audio signal in a frequency multiplex mode in a motion picture track of said magnetic tape where said analog video signal of said motion picture is recorded.

5. A magnetic recording device as claimed in claim 1, wherein said receiving means operates to receive said digital video signal of said selected frame within a predetermined period.

6. A magnetic recording device as claimed in claim 1 wherein said PCM still picture recording means further comprises:
    instruction means for producing an instruction signal for a PCM still picture recording operation, said means for receiving responsive to said instruction signal to receive said digital video signal, said means for converting said expanded signal operating to convert said digital video signal thus time-axis-expanded into a PCM signal which is recorded on said magnetic tape over a plurality of continual head scanning periods.

7. A magnetic recording device as claimed in claim 6, wherein said receiving means includes means for subjecting said digital video signal thus received to time axis expansion at a predetermined rate in a steady mode.

8. A magnetic recording device as claimed in claim 7, wherein said PCM still picture recording means further comprises means for continuing, when an instruction to suspend a motion picture recording operation is issued during a still picture recording operation, the PCM still picture recording of said still picture to the completion thereof.

9. A magnetic recording device as claimed in claim 1, wherein said PCM still picture recording means includes means for selectively performing the PCM still picture recording operation or a PCM audio recording operation during each scanning period of said magnetic heads, said PCM still picture recording means further comprising:

means for converting said expanded digital video signal into a PCM signal when said still picture recording operation is selected, and means for converting a time compressed digital audio signal into a PCM signal when said audio recording operation is selected, which is recorded during each head scanning period of time.

* * * * *